US009774676B2

(12) United States Patent
Dean et al.

(10) Patent No.: US 9,774,676 B2
(45) Date of Patent: Sep. 26, 2017

(54) STORING AND MOVING DATA IN A DISTRIBUTED STORAGE SYSTEM

(71) Applicant: Google Inc., Mountain View, CA (US)

(72) Inventors: Jeffrey Adgate Dean, Palo Alto, CA (US); Sanjay Ghemawat, Mountain View, CA (US); Yasushi Saito, Mountain View, CA (US); Andrew Fikes, Los Altos, CA (US); Christopher Jorgen Taylor, Palo Alto, CA (US); Sean Quinlan, Palo Alto, CA (US); Michal Piotr Szymaniak, Mountain View, CA (US); Sebastian Kanthak, San Jose, CA (US); Wilson Cheng-Yi Hsieh, Syosset, NY (US); Alexander Lloyd, New York, NY (US); Michael James Boyer Epstein, Brooklyn, NY (US)

(73) Assignee: GOOGLE INC., Mountain View, CA (US)

( * ) Notice: Subject to any disclaimer, the term of this patent is extended or adjusted under 35 U.S.C. 154(b) by 330 days.

(21) Appl. No.: 13/899,495

(22) Filed: May 21, 2013

(65) Prior Publication Data

US 2013/0346540 A1    Dec. 26, 2013

Related U.S. Application Data

(60) Provisional application No. 61/649,872, filed on May 21, 2012.

(51) Int. Cl.
*G06F 13/00* (2006.01)
*H04L 29/08* (2006.01)

(52) U.S. Cl.
CPC .............................. *H04L 67/1097* (2013.01)

(58) Field of Classification Search
CPC ......... H04L 29/08549; H04L 29/08072; H04L 29/06; H04L 67/1097; G06F 15/167;
(Continued)

(56) References Cited

U.S. PATENT DOCUMENTS 5,333,315 A * 7/1994 Saether ................. G06F 3/0601
5,421,007 A   5/1995 Coleman et al.
(Continued)

FOREIGN PATENT DOCUMENTS

CN    101001148    7/2007
CN    101316274    12/2008
(Continued)

OTHER PUBLICATIONS

International Search Report and Written Opinion dated Nov. 14, 2013, received in International Application No. PCT/US2013/044105, which corresponds to U.S. Appl. No. 13/909,021, 7 pages. (Yasushi Saito).
(Continued)

*Primary Examiner* — Robert B Harrell
(74) *Attorney, Agent, or Firm* — Morgan, Lewis & Bockius LLP

(57) ABSTRACT

A system, computer-readable storage medium storing at least one program, and a computer-implemented method for identifying a storage group in a distributed storage system into which data is to be stored is presented. A data structure including information relating to storage groups in a distributed storage system is maintained, where a respective entry in the data structure for a respective storage group includes placement metrics for the respective storage group. A request to identify a storage group into which data is to be stored is received from a computer system. The data structure is used to determine an identifier for a storage group whose placement metrics satisfy a selection criterion. The
(Continued)

identifier for the storage group whose placement metrics satisfy the selection criterion is returned to the computer system.

9 Claims, 27 Drawing Sheets

(58) Field of Classification Search
CPC .............. G06F 3/067; G06F 17/30067; G06F 17/30949; G06F 17/3015; G06F 17/30091; G06F 17/3012
USPC .......................................... 707/698; 709/214
See application file for complete search history.

(56) References Cited

U.S. PATENT DOCUMENTS

| | | | |
|---|---|---|---|
| 5,832,521 | A | 11/1998 | Klots et al. |
| 6,477,544 | B1 | 11/2002 | Bolosky et al. |
| 6,772,155 | B1 | 8/2004 | Stegelmann |
| 6,963,914 | B1 | 11/2005 | Breitbart et al. |
| 6,981,114 | B1 | 12/2005 | Wu et al. |
| 7,334,004 | B2 | 2/2008 | Ganesh et al. |
| 7,363,326 | B2 | 4/2008 | Margolus |
| 7,430,570 | B1 | 9/2008 | Srinivasan et al. |
| 7,567,973 | B1 | 7/2009 | Burrows et al. |
| 7,774,469 | B2 | 8/2010 | Massa et al. |
| 8,627,135 | B2 | 1/2014 | Aron et al. |
| 8,719,432 | B1 | 5/2014 | Vermeulen et al. |
| 8,806,323 | B2 | 8/2014 | Samavedula |
| 8,838,539 | B1 | 9/2014 | Ashcraft et al. |
| 8,850,130 | B1 | 9/2014 | Aron et al. |
| 8,949,208 | B1 * | 2/2015 | Xu et al. ........................ 707/698 |
| 2002/0133507 | A1 | 9/2002 | Holenstein et al. |
| 2002/0178249 | A1 | 11/2002 | Prabakaran et al. |
| 2003/0065708 | A1 | 4/2003 | Jacobs et al. |
| 2003/0132855 | A1 | 7/2003 | Swan |
| 2005/0015404 | A1 | 1/2005 | Cherkasova |
| 2005/0066118 | A1 | 3/2005 | Perry |
| 2005/0149627 | A1 | 7/2005 | Schreter |
| 2005/0177590 | A1 | 8/2005 | Chen et al. |
| 2005/0192991 | A1 | 9/2005 | Nomoto |
| 2005/0210218 | A1 | 9/2005 | Hoogterp |
| 2006/0047895 | A1 | 3/2006 | Rowan |
| 2007/0016546 | A1 | 1/2007 | De Vorchik et al. |
| 2007/0050429 | A1 | 3/2007 | Goldring et al. |
| 2007/0183224 | A1 | 8/2007 | Erofeev |
| 2007/0219999 | A1 | 9/2007 | Richey et al. |
| 2008/0071853 | A1 | 3/2008 | Mosler et al. |
| 2008/0096662 | A1 | 4/2008 | Kuwahara et al. |
| 2008/0201366 | A1 | 8/2008 | Devarakonda et al. |
| 2008/0243879 | A1 | 10/2008 | Gokhale et al. |
| 2008/0250072 | A1 | 10/2008 | Nguyen |
| 2008/0263305 | A1 | 10/2008 | Shu et al. |
| 2009/0070330 | A1 | 3/2009 | Hwang et al. |
| 2009/0327642 | A1 | 12/2009 | Ogihara et al. |
| 2010/0023520 | A1 | 1/2010 | Barboy et al. |
| 2010/0077165 | A1 | 3/2010 | Lu et al. |
| 2010/0281013 | A1 | 11/2010 | Graefe |
| 2011/0196664 | A1 | 8/2011 | Zunger et al. |
| 2012/0036161 | A1 | 2/2012 | Lacapra et al. |
| 2012/0151272 | A1 | 6/2012 | Behrendt et al. |
| 2012/0159102 | A1 | 6/2012 | Kan |
| 2012/0303791 | A1 | 11/2012 | Calder et al. |
| 2013/0060742 | A1 | 3/2013 | Chang et al. |
| 2013/0110774 | A1 | 5/2013 | Shah et al. |
| 2013/0204991 | A1 | 8/2013 | Skjolsvold et al. |
| 2013/0318129 | A1 | 11/2013 | Vingralek et al. |
| 2013/0346365 | A1 | 12/2013 | Kan et al. |
| 2015/0012497 | A1 | 1/2015 | Clark et al. |

FOREIGN PATENT DOCUMENTS

| | | |
|---|---|---|
| CN | 101854392 | 10/2010 |
| WO | WO 2011/100366 A2 | 8/2011 |
| WO | WO 2012/040391 A1 | 3/2012 |

OTHER PUBLICATIONS

International Search Report and Written Opinion dated Dec. 13, 2013, received in International Application No. PCT/US2013/042063, which corresponds to U.S. Appl. No. 13/898,411, 17 pages (Jeffrey Adgate Dean).

Bernstein, Chapter 5-Multiversion Concurrency Control, Concurrency Control and Recovery in Database Systems, Jan. 1, 1987, 24 pgs.

Elmasri, Chapter 20—Physical Database Design and Tuning, Fundamentals of Database Systems, 6th Ed., Addison-Wesley, Jan. 1, 2011, 16 pgs.

Garcia-Molina, Chapter 18—Concurrency Control, Database Systems: The Complete Book, Prentice-Hall, Jan. 1, 2002, 72 pgs.

Garcia-Molina, Chapter 1—The Worlds of Database Systems, Database Systems: The Complete Book, Prentice Hall, Jan. 1, 2002, 21 pgs.

Google Inc., International Search Report and Written Opinion, PCT/US2013/044163, May 9, 2014, 11 pgs.

Zhang, Supporting Multi-Row Distributed Transactions with Global Snapshot Isolation Using Bare-Bones Hbase, 11th IEEE/ACM Int'l Conf. on Grid Computing, Piscataway, NJ, Oct. 25, 2010, pp. 177-184.

Google Inc., International Preliminary Report on Patentability, PCT/US2013/044105, Dec. 9, 2014, 4 pgs.

Google Inc., International Preliminary Report on Patentability, PCT/US2013/044163, Dec. 9, 2014, 9 pgs.

Ghemawat, The Google File System, Proc. of the ACM Symposium on Operating Systems Principles, Oct. 19, 2003, pp. 1-15.

Ivanova, Self-Organizing Strategies for a Column-Store Database, Proc. of the 11th International Conference on Extending Database Technology Advances in Database Technology, EDBT'08, Mar. 25, 2008, pp. 157-168.

Google Inc., Invitation to Pay Additional Fees, PCT/US2013/042063, Jul. 30, 2013, 8 pgs.

Chang, Bigtable: A Distributed Storage System for Structured Data, Google, Nov. 2006, 14 pgs, research.google.com/archive/bigtable.html.

Notification of First Office Action CN 201380037792.3, Sep. 28, 2016, 11 pgs.

* cited by examiner

STORING AND MOVING DATA IN A DISTRIBUTED STORAGE SYSTEM

RELATED APPLICATIONS

This application claims priority to U.S. Provisional Application Ser. No. 61/649,872, filed May 21, 2012, entitled "Storing and Moving Data in a Distributed Storage System," which is incorporated by reference herein in its entirety.

TECHNICAL FIELD

The disclosed embodiments relate generally to storing and moving data in a distributed storage system.

BACKGROUND

In a distributed computing system, a plurality of servers are used to provide load balancing and/or provide low-latency points of access to nearby computer systems. For example, in a distributed storage system, data is replicated in storage clusters that are located across multiple geographical locations. In doing so, the availability of the data is increased and the network proximity of the data to client computer systems is decreased. However, performing data operations in the distributed storage cluster becomes more difficult due to the distributed manner in which data is stored in the distributed storage system. It is desirable to provide techniques for efficiently performing data operations in the distributed storage system.

SUMMARY

In accordance with some implementations, a computer-implemented method is provided for moving data between storage groups in a distributed storage system. The method is performed on a server having one or more processors and memory. The memory stores one or more program for execution by the processors. In some implementations, the programs are stored on a non-transitory computer readable storage medium. The programs comprise executable instructions, and the programs execute to perform the method. The server receives, from a computer system, a request to move data from a first storage group to a second storage group in the distributed storage system. The server creates a second container in the second storage group to receive the data from the first storage group. The server then copies the data from a first container in the first storage group to the second container in the second storage group. After the data has been copied, a transaction is executed that performs all of the following operations: deleting the first container in the first storage group; in an index in the distributed storage system, dissociating a first identifier for the first container from the data; and, in the index in the distributed storage system associating a second identifier for the second container with the data.

In accordance with some implementations, after creating the second container in the second storage group to receive the data from the first storage group, the second container is marked with an incoming data indicator to indicate that the second container is to receive data.

In accordance with some implementations, the transaction includes an operation to remove the incoming data indicator from the second container.

In accordance with some implementations, when any operation in the transaction fails, the transaction is aborted and the operations of the transaction that have already been performed are rolled back.

In accordance with some implementations, the data is accessible from the first storage group until all the operations of the transaction are successfully performed.

In accordance with some implementations, the data is accessible from the second storage group only after all of the operations of the transaction are successfully performed.

In accordance with some implementations, the request includes an identifier of the first storage group, an identifier of the second storage group, and the identifier for the first container.

In accordance with some implementations, the index includes a plurality of directories, where at least one directory includes one or more containers for data. In some instances, one or more of the containers for data are directory splits.

In accordance with some implementations, the server is a server for the second storage group.

BRIEF DESCRIPTION OF THE DRAWINGS

The embodiments disclosed herein are illustrated by way of example, and not by way of limitation, in the figures of the accompanying drawings. Like reference numerals refer to corresponding parts throughout the drawings.

DETAILED DESCRIPTION

Figure 1A:
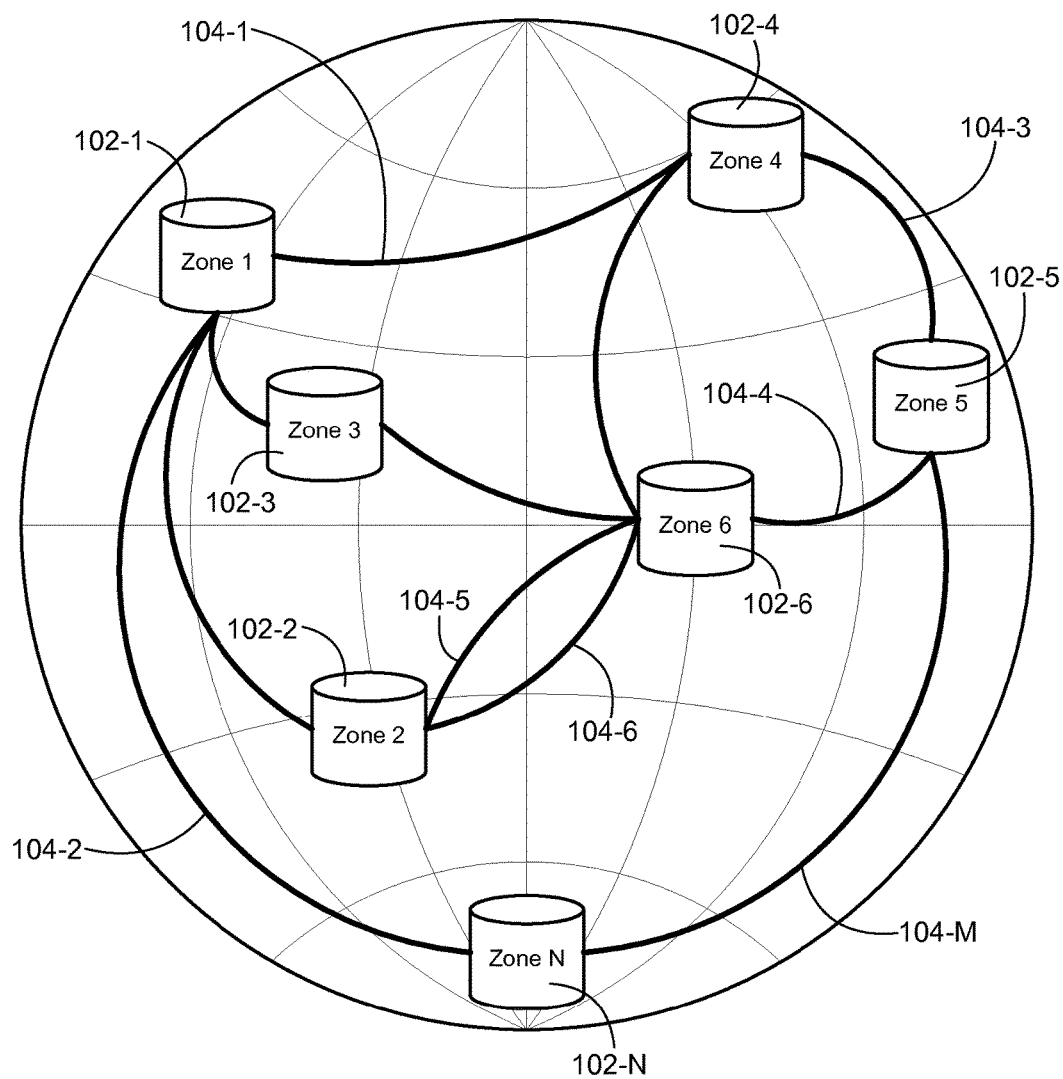
FIG. 1A is a block diagram illustrating a distributed storage system, according to some embodiments.

FIG. 1A is a block diagram illustrating a distributed storage system 100, according to some embodiments. The distributed storage system 100 includes a plurality of zones 102-1, 102-2, ... 102-N at various locations across the world, connected by network communication links 104-1, 104-2, ... 104-M. In some embodiments, a zone (such as the zone 1 102-1) corresponds to one or more data centers that are geographically close to each other. For example, the North American region may correspond to one zone that includes two data centers, one located near the Pacific Coast and the other one located near the Atlantic Coast. Although the conceptual diagram of FIG. 1A shows a limited number of network communication links 104-1, etc., typical embodiments would have many more network communication links. In some embodiments, there are two or more network communication links between the same pair of zones, as illustrated by links 104-5 and 104-6 between the zone 2 (102-2) and the zone 6 (102-6). In some embodiments, the network communication links are composed of fiber optic cable. In some embodiments, some of the network communication links use wireless technology, such as microwaves. In some embodiments, each network communication link has a specified bandwidth and/or a specified cost for the use of that bandwidth. In some embodiments, each zone maintains the statistic information about the transfer of data across one or more of the network communication links within the distributed storage system 100, including throughput rate, times of availability, reliability of the links, etc.

Figure 1B:
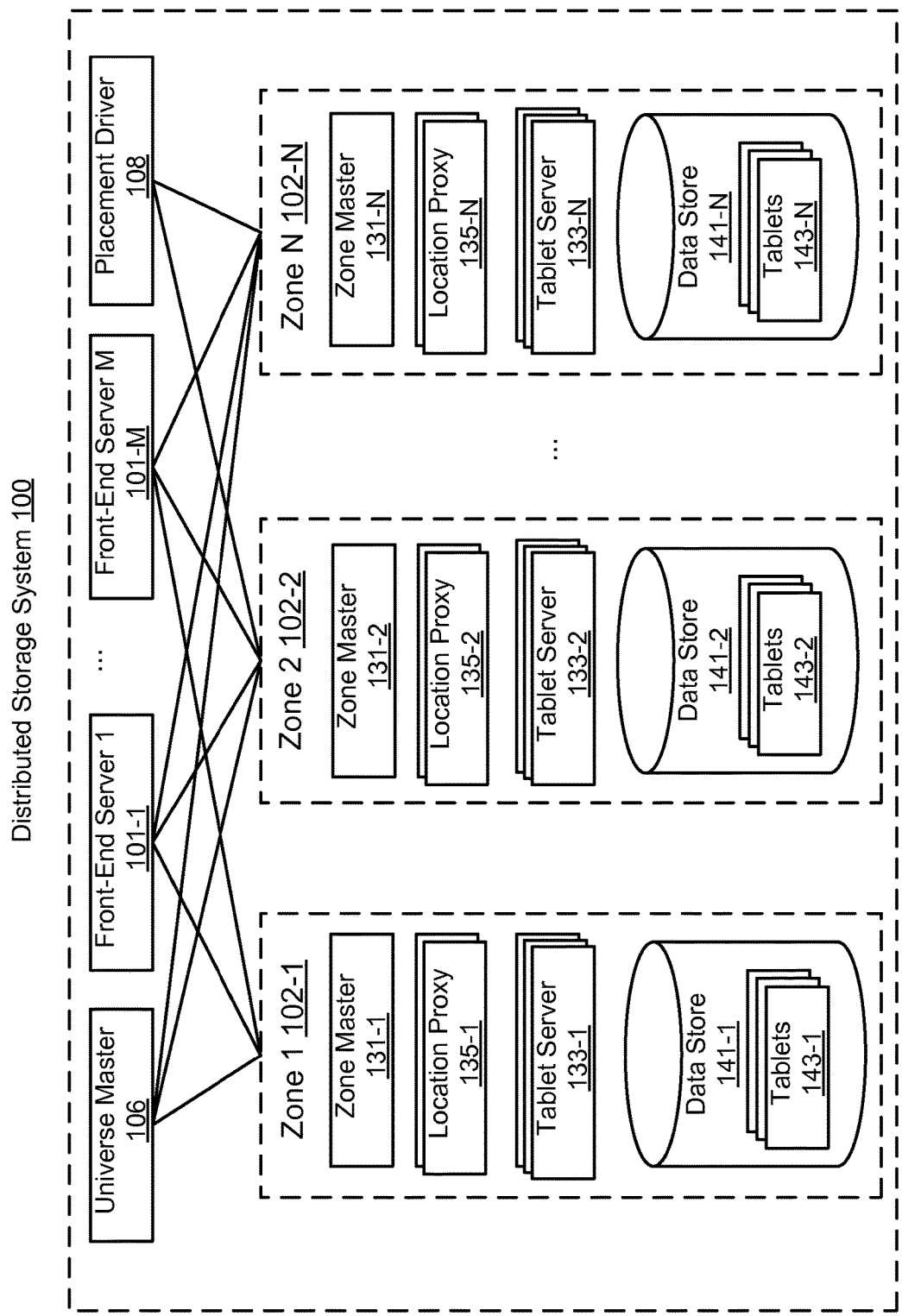
FIG. 1B is a block diagram illustrating components of the distributed storage system, according to some embodiments.

FIG. 1B illustrates the components of the distributed storage system 100, according to some embodiments. The distributed storage system 100 includes a universe master 106, one or more front-end servers (101-1, ..., 101-M), a placement driver 108, and a plurality of zones (102-1, 102-2, ..., 102-N). The universe master 106 and the placement driver 108 are responsible for monitoring the performance of the system 100 and controlling the data replication/migration between two zones. A zone (102-1, 102-2, ..., 102-N) typically includes a data store (141-1, 141-2, ..., 141-N) hosting a plurality of tablets (143-1, 143-2, ..., 143-N), and utilizes a cluster of computer servers, including a zone master (131-1, 131-2, ..., 131-N), one or more location proxies (135-1, 135-2, ..., 135-N), one or more tablet servers (133-1, 133-2, ..., 133-N) to perform all of the tablet-related tasks. The data store (141-1, 141-2, ..., 141-N) provides the underlying persistent storage space for data managed by a corresponding zone (102-1, 102-2, ..., 102-N). In some embodiments, data within the data store (141-1, 141-2, ..., 141-N) are organized into many tablets, which is a basic data unit handled within a particular zone. The zone master (131-1, 131-2, ..., 131-N) is responsible for assigning each tablet in the data store (141-1, 141-2, ..., 141-N) to one of the tablet servers (133-1, 133-2, ..., 133-N) for handling read/write requests directed at the tablet based, at least in part, on the CPU and memory usage at the tablet servers. For example, when the zone master determines that one tablet server is overloaded, it may orchestrate the migration of some tablets from this overloaded tablet server to other tablet servers in the same zone or maybe even another zone. A location proxy provides a location-lookup service to another entity (e.g., a front-end server or a tablet server) such that, for a given tablet, the location proxy identifies a respective tablet server that has been chosen for handling the read and write requests directed at the tablet.

Figure 1C:
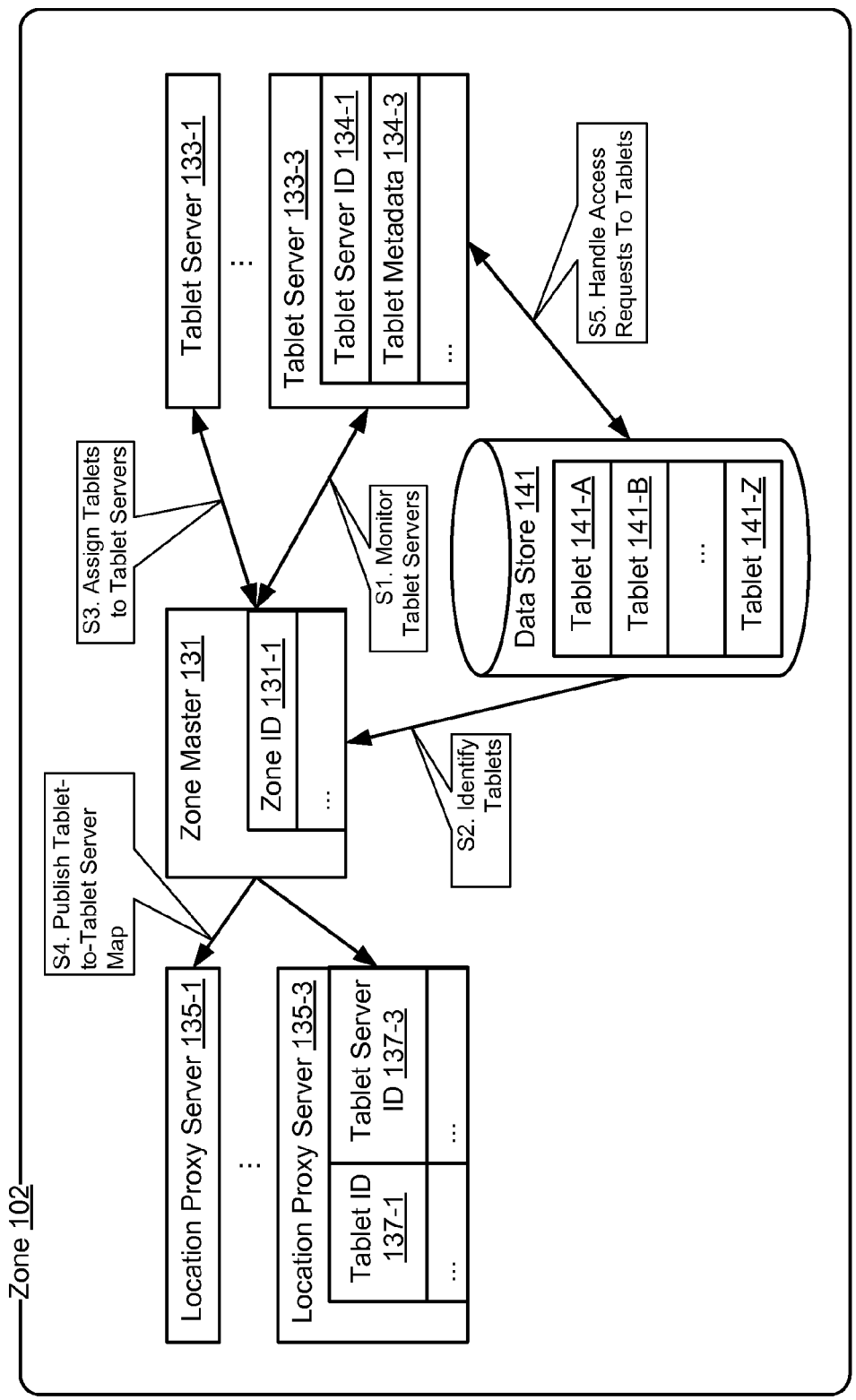
FIG. 1C is a block diagram illustrating how different components within a zone coordinate with each other to perform various tablet-related tasks, according to some embodiments.

FIG. 1C illustrates in more detail how different components within a zone coordinate with each other to perform various tablet-related tasks, according to some embodiments. In this example, the zone 102 includes a zone master 131, a plurality of tablet servers (133-1, 133-3), a plurality of location proxy servers (135-1, 135-3), and a data store 141 that includes multiple tablets (141-A, 141-B, . . . , 141-Z). The zone master 131 has a zone ID 131-1 that uniquely identifies the zone 102 among a plurality of zones in a distributed storage system as shown in FIG. 1B. As will be described below in connection with FIG. 1D, the zone ID is used by a front-end server 101 for determining which zone includes the client-requested data. As described above, the location proxy servers (135-1, 135-3) provide a location-lookup service to other entities. In some embodiments, a location proxy server uses a lookup table to support the location-lookup service. FIG. 1C depicts an exemplary lookup table, each row of the table including a tablet ID 137-1 and a tablet server ID 137-3. In response to a tablet ID provided by another entity, the location proxy server returns a tablet server ID to the requesting entity, which identifies a tablet server that is chosen by the zone master 131 for managing the corresponding tablet associated with the tablet ID. Accordingly, the requesting entity can communicate with the identified tablet server with respect to tasks associated with the tablet. A tablet server 133-3 is identified by a tablet server ID 134-1 and further includes tablet metadata 134-3 associated with the tablets managed by the tablet server 133-3. For example, the tablet metadata 134-3 includes the tablet IDs of the tablets managed by the tablet server 133-3. In some embodiments, the tablet metadata 134-3 also includes information about the splits associated with the tablet. A more detailed description of the relationship between a split and a tablet is provided below in connection with FIG. 1D.

In some embodiments, the zone master 131 monitors the performance of the tablet servers (133-1, 133-3) by periodically (e.g., after every 10 seconds) communicating with the tablet servers (133-1, 133-3). A tablet server reports to the zone master 131 its current status information, including its CPU and memory usage, etc., as well as other information used for determining the association between a set of tablets and the tablet server. Based on such information, the zone master 131 determines whether or not to assign a tablet in the data store 141 to a corresponding tablet server. For example, the zone master 131 may identify some tablets associated with one tablet server 133-3, which is deemed to be overloaded, and assign the identified tablets to another tablet server 133-1. In addition, the zone master 131 publishes the updated tablet-to-tablet server map through the location proxy servers (135-1, 135-3). When another entity (e.g., a front-end server or a tablet server) wants to learn which tablet server is responsible for managing a particular tablet, the entity can query one of the location proxy servers by providing a tablet ID and receiving a corresponding tablet server ID associated with the tablet ID. After identifying a tablet server for a particular tablet through the location-lookup service, the entity can communicate with the identified tablet server for any read/write access requests directed at the tablet.

Figure 1D:
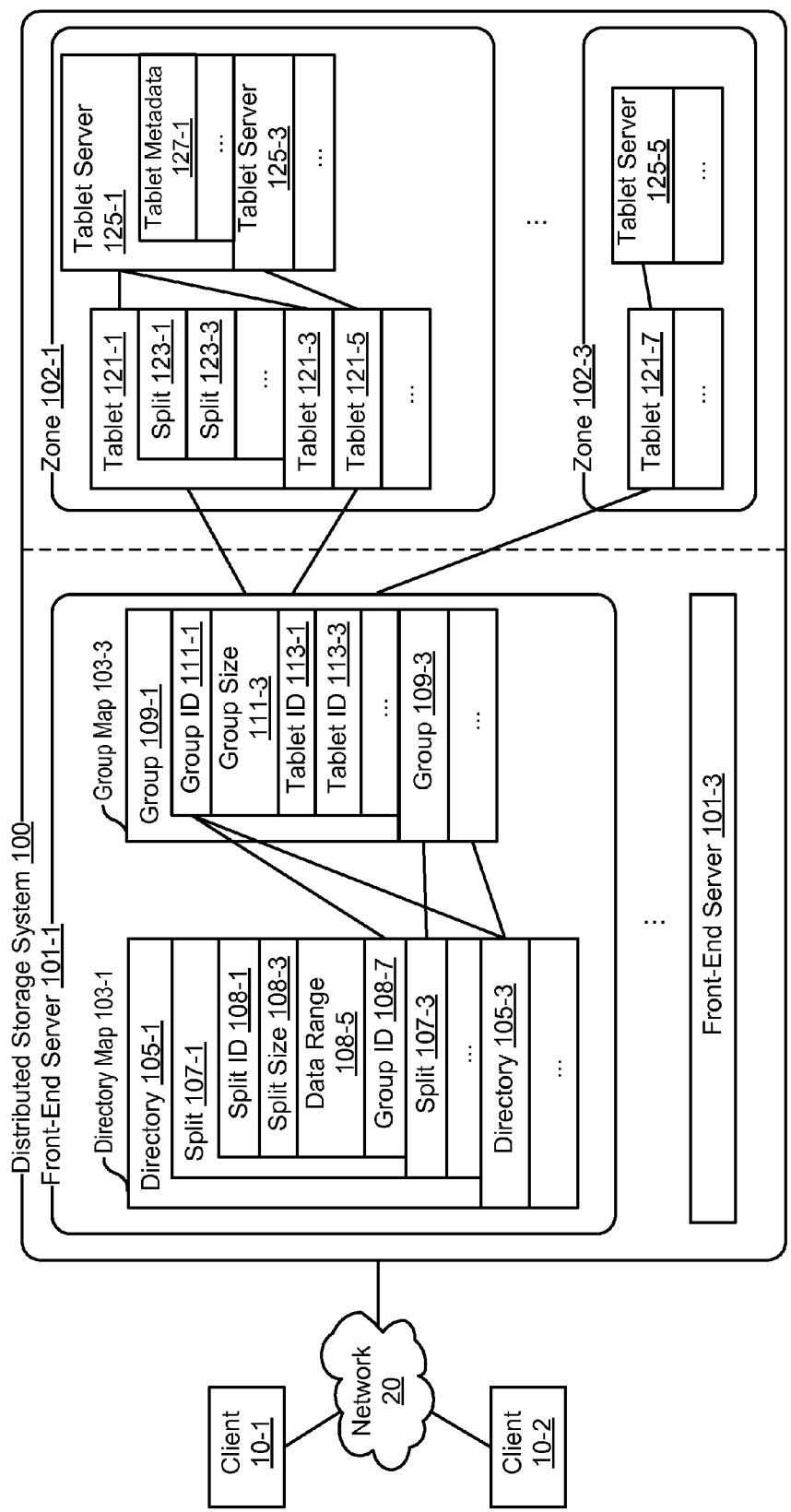
FIG. 1D is a block diagram illustrating how different components within the distributed storage system interact with each other to satisfy data access requests from different clients, according to some embodiments.

FIG. 1D illustrates how different components within the distributed storage system 100 interact with each other to satisfy data access requests from different clients, according to some embodiments. In this example, the clients (10-1, 10-2) are connected to the distributed storage system 100 via a network 20 (e.g., Internet) and they send requests for accessing data hosted by the distributed storage system 100. In this application, the term "client" may refer to a client computer (e.g., a desktop/laptop computer or a mobile device such as a tablet computer or a smartphone) from which an end user initiates a request for accessing a piece of data managed by the distributed storage system 100. Alternatively, the term "client" may refer to a computer server that provides on-line services (e.g., email or advertising) to multiple users and uses the distributed storage system 100 for hosting data associated with the on-line services. In either case, the distributed storage system 100 is responsible for identifying and returning the client-requested data to the requesting clients upon receipt of such requests from the clients. For illustrative purposes, it is assumed that one of the clients is an on-line advertising service provider and the distributed storage system 100 hosts data associated with different customers of the on-line advertising service provider.

When the client wants to access data associated with a customer, it submits a data access request to a front-end server 101. In some embodiments, different front-end servers (shown in FIG. 1C) are responsible for providing data-related services to different clients. For example, some of the front-end servers are configured for handling data access requests from clients for access email service data and some other front-end servers are configured for handling data access requests from clients for access advertising service data. In some embodiments, data associated with an online service application is further partitioned into multiple portions and each front-end server is configured for handling a subset of the data access requests for one or more portions of the data. In some embodiments, the front-end servers of the distributed storage system are located at different geographical locations to provide services to nearby clients that submit data access requests associated with different online services. As shown in FIG. 1D, a client submits a data access request by invoking an application programming interface (API) accepted by the front-end server 101. The data access request includes identification information of the one or more customers. In some embodiments, the data associated with a customer corresponds to a row in a data table and the row of customer data is further divided into multiple columns. The data access request may include a row identifier and possibly one or more column identifiers if the client is interested in accessing data in the one or more columns associated with each customer. Upon receipt of the data access request, the front-end server 101 needs to determine where the client-requested data is located in the distributed storage system 100 such as information about the zone and tablet(s) that have the client-requested data.

As shown in FIG. 1D, different components in the distributed storage system 100 are organized into two domains based on their respective roles: (i) the logical domain including the front-end servers (101-1, 101-3) and (ii) the physical domain including the zones (102-1, 102-3). The front-end servers handle data access requests from the external clients and use data structures such as the directory map 103-1 and the group map 103-3 to free the clients from understanding how data is physically stored in the distributed storage system 100. In some embodiments, each customer of the on-line advertising service is associated with one directory in the directory map 103-1. Based on the logical directory identifier provided by a client, the front-end server 101-1 identifies a particular entry in the directory map 103-1, which corresponds to the particular customer.

To improve the scalability of the distributed storage system 100, data associated with a customer is divided into multiple segments, which are referred to as "directory splits" (hereinafter referred to as "splits"), each split having a unique split ID in the directory map 103. As shown in FIG. 1D, each directory (e.g., directory 105-1) includes one or more splits (107-1 and 107-3). The number of splits associated with a directory is determined by the size of data associated with a corresponding customer. The more data the customer has, the more splits the data may be divided into. When the size of data within a split reaches a predefined threshold, no more data is added to the split and a new split is generated for hosting new data associated with the account. In some embodiments, there is no limit on the size of data for an account. In other embodiments, the size of data for an account is set to a predetermined limit. The predetermined limit may be determined by the distributed storage system 100 (e.g., a global limit of the size of data that is applied to all accounts), the application for which the data for the account is associated (e.g., a web mail application may impose a limit of the size of data for its accounts that are different than an advertisement application), and/or may be increased if an end user purchases more storage space for an account. Note that the client (i.e., the on-line advertising service provider) does not need to know which split(s) has the client-requested data. Instead, the client specifies the requested data in a request using a format defined by the client-associated online service provider and the front-end server 101-1 translates the client request into a set of split IDs that identify the splits including the client-requested data.

To improve the reliability and efficiency of the distributed storage system 100, data associated with a customer is replicated into multiple copies and stored in different tablets of one or more zones. In other words, the basic data unit for a particular customer in a front-end server is a split and the basic data unit in a zone is a tablet. As shown in FIG. 1D, a group in the group map 103-2 is defined to associate a split in the directory map 103-1 with a plurality of tablets in a particular zone. In this example, the split 107-1 is a data structure associating the split ID 108-1 with a group ID 108-7, which corresponds to an entry 109-1 in the group map 103-3. The split 107-1 also includes a split size 108-3 indicating the actual amount of data currently within this split and a data range indicator 108-5. As will be described below, the data range indicator is used for indicating whether the split has space for more data or not. When the split runs out of space, a new split (e.g., split 107-3) will be created for hosting new data associated with the account. In this example, the split 107-3 is associated with the group 109-3, not the group 109-1. Note that different splits associated with an account may belong to the same group of splits or different groups of splits. Each group includes a plurality (e.g., hundreds or even thousands) of splits associated with different accounts and has a predefined group limit. The exact association between a split and a group is dynamically determined based, in part, on the remaining capacity of a particular group. In some embodiments, the front-end server tries to add different splits associated with the same account to the same group because these splits are likely to be accessed by a client at the same time and it is probably more convenient for them to be within the same group and therefore the same set of tablets, which are replicas of the group. If the group (e.g., group 109-1) runs out of space, the front-end server may identify another group (e.g., group 109-3) for the split 107-3. In some embodiments, the data replication policy is defined for each account, the group 109-3 is chosen for the split 107-3 because it has the same number of tablets as the group 109-1. In other words, splits associated with different accounts that have different data replication policies should be added to different groups with different numbers of tablets.

In accordance with a data replication policy provided by the client, a predefined number of instances of the group are generated in the distributed storage system 100, each instance of the group being referred to as a tablet. As shown in FIG. 1D, the group 109-1 has a group ID 111-1 (which is the same as the group ID 108-7 in the split 107-1), a group size 111-3, and a list of tablet IDs (e.g., tablet IDs 113-1, 113-3) of the group. Splits associated with different directories (e.g., directory 105-1 and directory 105-3) both belong to the group 109-1, suggesting that the two accounts corresponding to the two directories have the same data replication policy. In response to a client request, the front-end server 101-1 first identifies one or more split IDs in the directory map 103-1, which are associated with a customer identified by the client request, and then identifies a group and an associated list of tablet IDs for each split ID. FIG. 1D depict an embodiment in which different splits (as identified by the split IDs 107-1 and 107-3) associated with one customer are assigned to different groups (the group 109-1 and the group 109-3). This situation happens when the size of a group reaches a predefined group limit such that it is less efficient to keep all the data associated with one customer (e.g., multiple splits) in one group and therefore one tablet.

After the front-end server 101-1 identifies the tablet IDs in a group of splits that includes the client-requested data, the process of accessing the client-requested data is shifted from the logical domain to the physical domain, i.e., a zone that includes the tablets associated with the identified tablet IDs. In some embodiments, a tablet ID (113-1 or 113-3) includes a respective zone ID embedded therein. Therefore, after identifying the tablet IDs, the front-end server 101-1 also knows which zone has the client-requested data. As noted above, each zone includes one or more location proxy servers that provide the location-look up service for identifying a particular tablet server for each tablet. Based on the zone ID included in a tablet ID, the front-end server 101-1 submits a query to a respective location proxy server at a particular zone identified by the zone ID, the query including one or more tablet IDs (113-1, 113-3). The location proxy server then returns one or more tablet server IDs, each tablet server ID identifying a respective tablet server (e.g., the tablet server 125-1 or the tablet server 125-3) that has been chosen by the zone master for managing the data access requests to the particular tablet. Upon receipt of the one or more tablet server IDs, the front-end sever 101-1 submits a request to a corresponding tablet server, the request including identification of one or more splits (e.g., splits 123-1 and 123-3) within the tablet (e.g., the tablet 121-1). In response to the request, each tablet server identifies a corresponding tablet in the data store and performs the operations to the identified tablet accordingly.

Figure 1E:
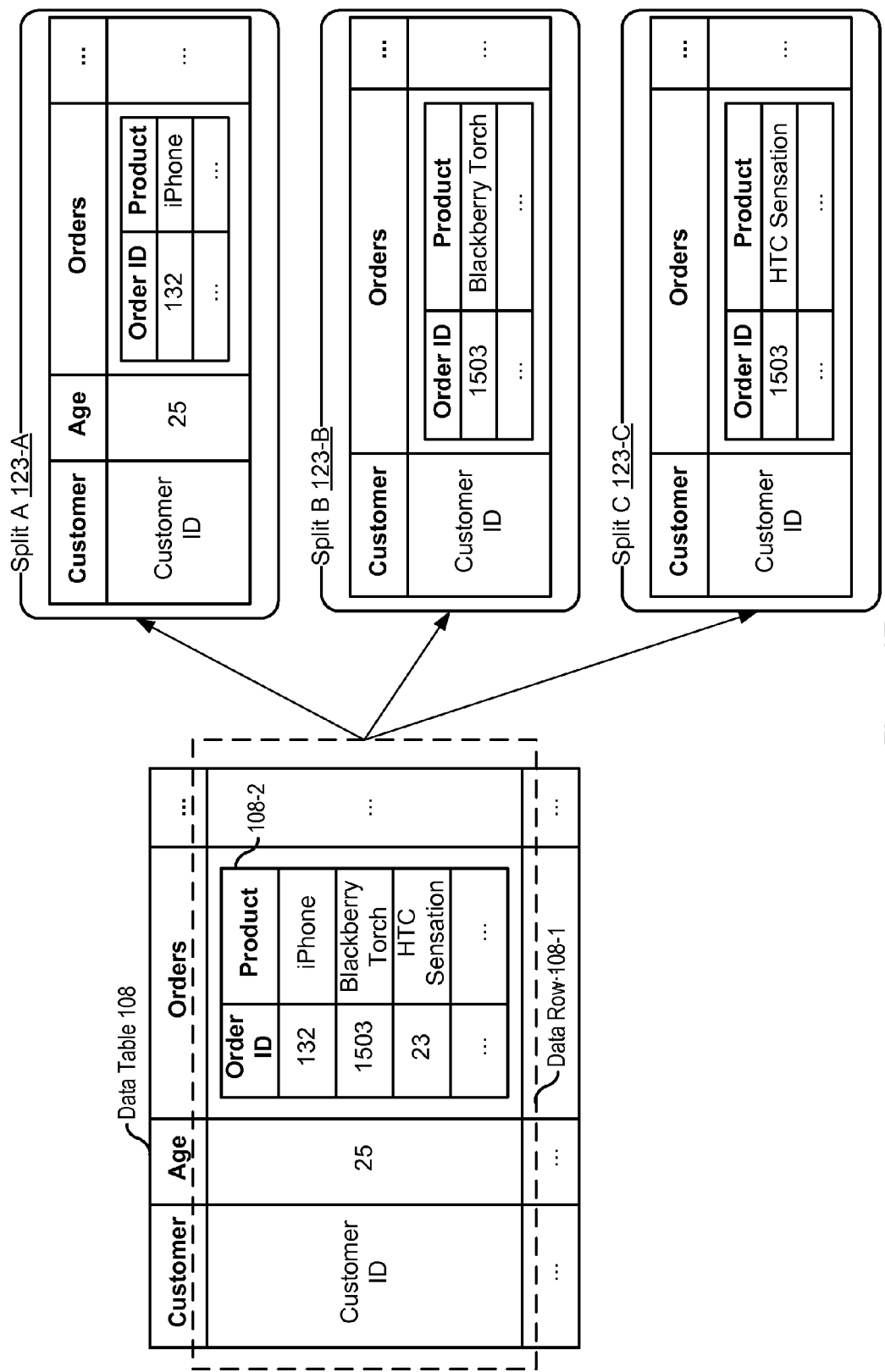
FIG. 1E is a block diagram illustrating example directory splits, according to some embodiments.

FIG. 1E illustrates how the customer data of an on-line advertising service is divided into multiple splits, according to some embodiments. The data table 108 illustrates how the customer data is stored in a table-like data structure. As shown in the figure, each row 108-1 in the data table 108 represents the data associated with a particular customer whose customer ID is a primary key of the data row. The data row 108-1 includes multiple columns. Some columns such as the "Customer" column and the "Age" column each have one attribute value whereas some other columns include an embedded data structure (e.g., the embedded table 108-2). As shown in the figure, the data row 108-1 is divided into multiple splits (123-A, 123-B, 123-C) to accommodate the continuing addition of new data to the row, each split including a subset of the data row. In some embodiments, the partition of data columns into different splits is based on the relationships between different columns. For example, columns that are often accessed together are put into one split for efficiency. An embedded table within a particular column may be divided into multiple sections with each section belonging to one split as shown in FIG. 1E. As noted above, each split has a split ID for uniquely identifying the split. In some embodiments, the split ID is content-addressable. For example, the split ID may include information about the customer ID associated with the data row 108-1, the metadata associated with the split (e.g., the name of the columns in the split), and the customer data stored within the split. With such content-addressable split ID definition, it is easy for the front-end server to determine: (i) which split (and therefore a corresponding tablet) has the client-requested data based on the information in the client request and (ii) which split (and therefore a corresponding tablet) does not have the client-requested data and can be ignored for the particular client request. As a result, the front-end server only needs to communicate with a tablet server that is responsible for managing the tablet. In some embodiments, the split ID includes a range of string-like keys that correspond to a range of data associated with a customer.

Note that although FIG. 1 shows particular numbers of instance of the zones 102, the universe master 106, the front end servers 101, the placement server 108, the location proxy servers 135, the zone master 131, the tablet servers 133, the data stores 141, and the clients 10, any number of instances of zones, universe masters, front end servers, placement servers, location proxy servers, zone masters, tablet servers, data stores, and the clients may be present in the distributed storage system 100. For example, each of the zones 102, the universe master 106, the front end servers 101, the placement server 108, the location proxy servers 135, the zone master 131, the tablet servers 133, the data stores 141 may include a plurality of distributed servers. The plurality of distributed servers may provide load balancing and/or may provide low-latency points of access to nearby computer systems. The distributed servers may be located within a single location (e.g., a data center, a building, etc.) or may be geographically distributed across multiple locations (e.g., data centers at various geographical locations, etc.).

Figure 2A:
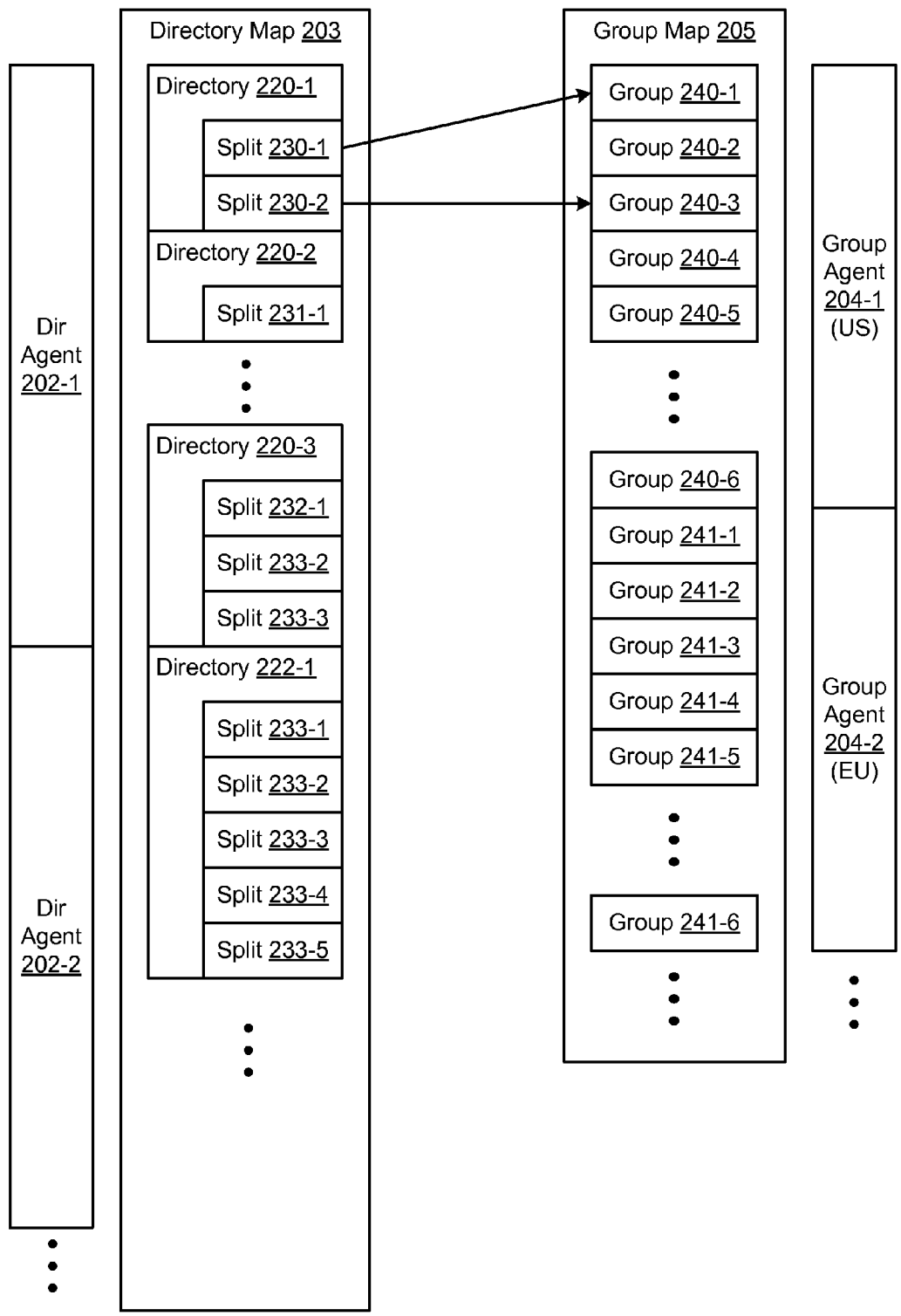
FIG. 2A is a block diagram illustrating a process for moving data between storage groups in a distributed storage system, according to some embodiments.

FIG. 2A is a block diagram illustrating a process for moving data between storage groups in the distributed storage system 100, according to some embodiments. FIG. 2A includes a directory map 203 and a group map 205. In some embodiments, the directory map 203 is a data structure for storing metadata for directories and associated splits. In some embodiments, the group map 205 is a data structure for storing metadata for storage groups and tablet servers that are associated with the storage groups. In some embodiments, the group map 205 is implemented using an instance of the data structure that is used for the directory map 203. In other words, the group map 205 and the directory map 203 use the same type of data structure to store metadata data.

As illustrated in FIG. 2A, the directory map 203 includes directories 220 and corresponding splits 230, 231, 232, and 233. In some embodiments, the directory map 203 is sharded to distribute the directory map 203 across a plurality of tablet servers. Note that a respective shard of the directory map 203 includes a respective portion of the rows (or entries) of the directory map 203. For example, a first shard of the directory map 203 may include rows (or entries) 1 to X, where X is less than the total number of rows (entries), M, of the directory map 203. FIG. 2A illustrates two shards of the directory map 203, each of which is handled by a directory agent 202 (e.g., dir agents 202-1 and 202-2). Note that the directory map 203 may include more or fewer shards than illustrated in FIG. 2A. In some embodiments, the directory agents 202 are tablet servers (e.g., the tablet server 133).

Also, as illustrated in FIG. 2A, the group map 205 includes storage groups 240 and 241. In some embodiments, the group map 205 is sharded to distribute the group map 205 across a plurality of tablet servers. Note that a respective shard of the group map 205 includes a respective portion of the rows (or entries) of the group map 205. For example, a first shard of the group map 205 may include rows (or entries) 1 to Y, where Y is less than the total number of rows (entries), N, of the directory map 203. FIG. 2A illustrates two shards of the group map 205, each of which is handled by a group agent 204 (e.g., group agents 204-1 and 204-2). Note that the group map 205 may include more or fewer shards than illustrated in FIG. 2A. In some embodiments, the group agents 204 are tablet servers (e.g., the tablet server 133). In some embodiments, the group map is sharded based on geographic regions. For example, the storage groups 240 may be located in the United States (US) and the storage groups 241 may be located in Europe (EU).

In some embodiments, each application in a distributed computing system is associated with its own instances of the directory map 203, the group map 205, the dir agents 202, and the group agents 204. For example, a webmail application in the distributed computing system has its own instances of the directory map 203, the group map 205, the dir agents 202, and the group agents 204 that are separate and distinct from an advertisement tracking application. Note that data for each application may be stored within the same storage clusters of the distributed storage system 100. For example, data for the webmail application may be stored in the same storage cluster (e.g., data center) as data for the advertisement tracking application.

In the example illustrated in FIG. 2A, the directory 220-1 has a split 230-1 and a split 230-2. The split 230-1 is associated with a storage group 240-1 and the split 230-2 is associated with a storage group 240-3. Both the storage group 230-2 and 240-2 are located in the US region. In other words, the actual placement of the splits 230-1 and 230-2 are in the US region. In some embodiments, the dir agent 202-1 periodically scans the directories 220-1 to 220-2 (e.g., the directories in the shard handled by the dir agent 202-1) to determine whether an actual placement of splits in the directories are in a desired placement. In this example, the dir agent 202-1 determines that the desired placement of the data for the directory 220-1 (i.e., the placement of the splits 230-1 and 230-2) is the EU region.

In some embodiments, the desired placement of a directory and/or of a particular split is determined by an application to which the data in the directory and/or split belongs.

For example, a webmail application may specify that that data for particular users must be located within a particular geographic region. In some embodiments, the desired placement of a directory and/or of a particular split is determined based on resource usage (e.g., storage, CPU, network bandwidth, etc.) in the distributed storage system 100. For example, the respective storage groups for the splits 230-1 and 230-2 may be full and/or the network links to the storage clusters may be overburdened. Thus, the splits 230-1 and 230-2 may be moved from their respective storage groups to storage groups in other storage clusters that have lower resource utilization. In some embodiments, the desired placement of a directory and/or of a particular split is determined by a placement policy. In some embodiments, the placement policy is determined by the application to which the data in the directory and/or split belongs. In some embodiments, the placement policy is determined based on the historical user actions and/or user state. For example, the placement policy may be determined based on a geographic location (e.g., United States, Europe, etc.) from where the user typically accesses the data.

Returning to the example illustrated in FIG. 2A, in response to determining that the desired placement of the data for the directory 220-1 (i.e., the placement of the splits 230-1 and 230-2) is the EU region, the dir agent 202-1 generates a move proposal 270 (see FIG. 2C) to move the splits 230-1 and 230-2 to the EU region. In some embodiments, the dir agent 202-1 maintains a queue of move proposals. Note that each dir agent 202 maintains a queue of move proposals. In some embodiments, the queue of move proposals is sorted based on priorities of the move proposals.

Figure 2B:
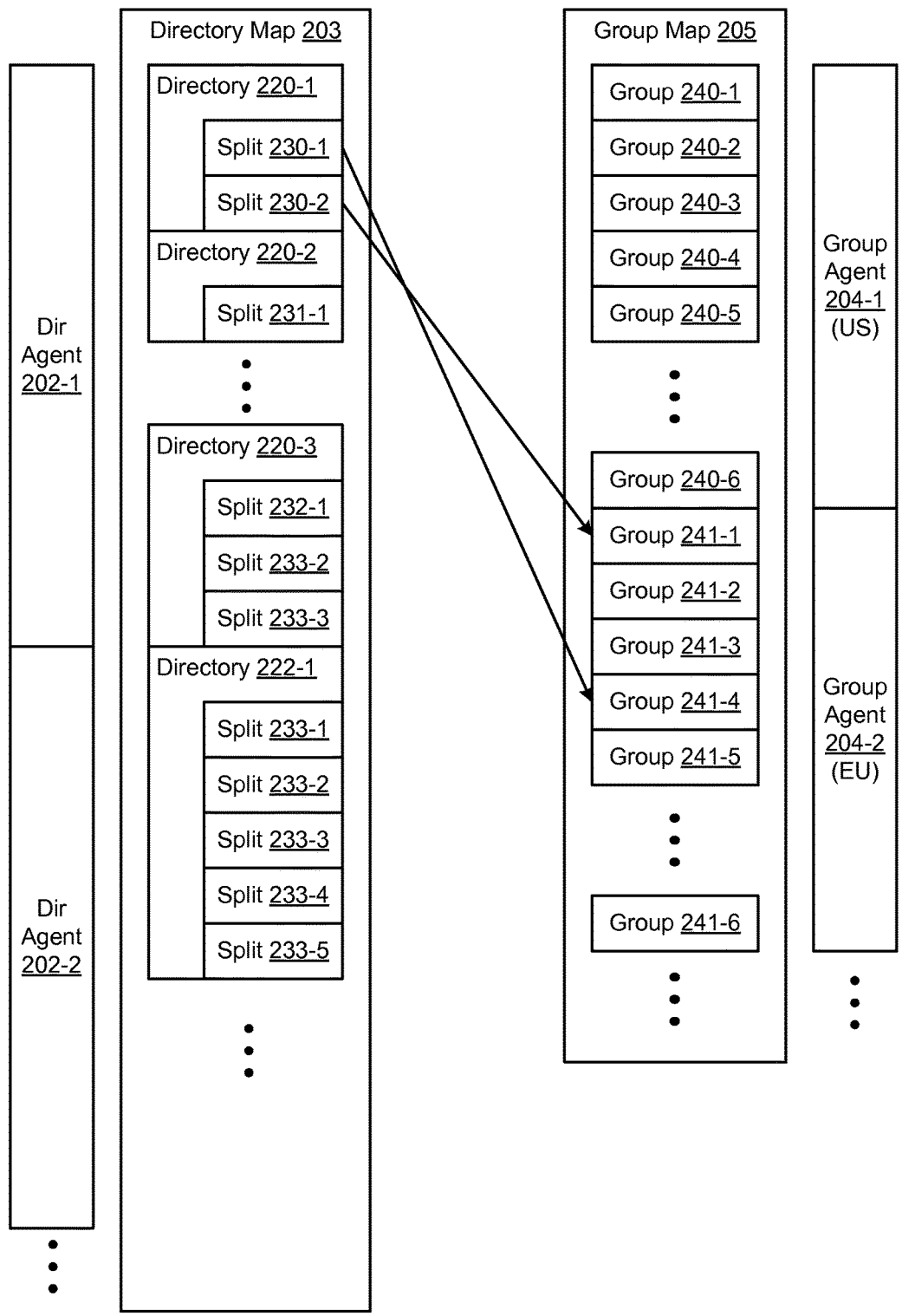
FIG. 2B continues the process illustrated in FIG. 2A, according to some embodiments.
Figure 2C:
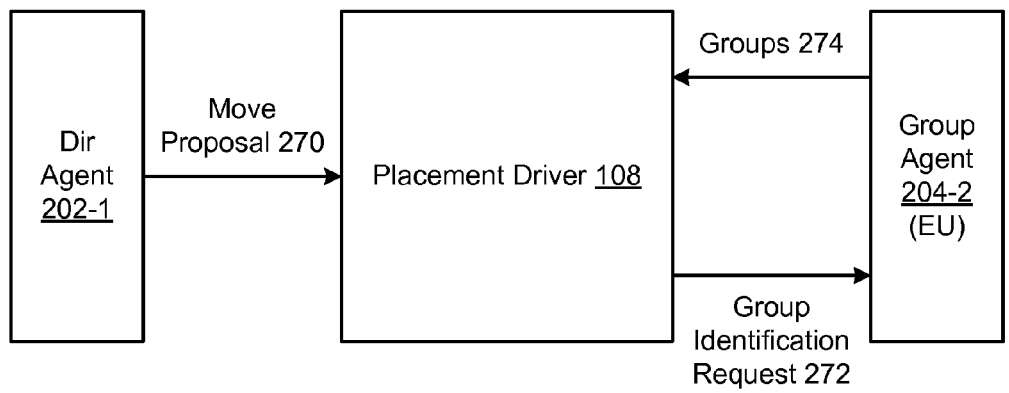
FIG. 2C is a block diagram illustrating data and commands used for moving the data between storage groups illustrated in FIGS. 2A and 2B, according to some embodiments.
Figure 2D:
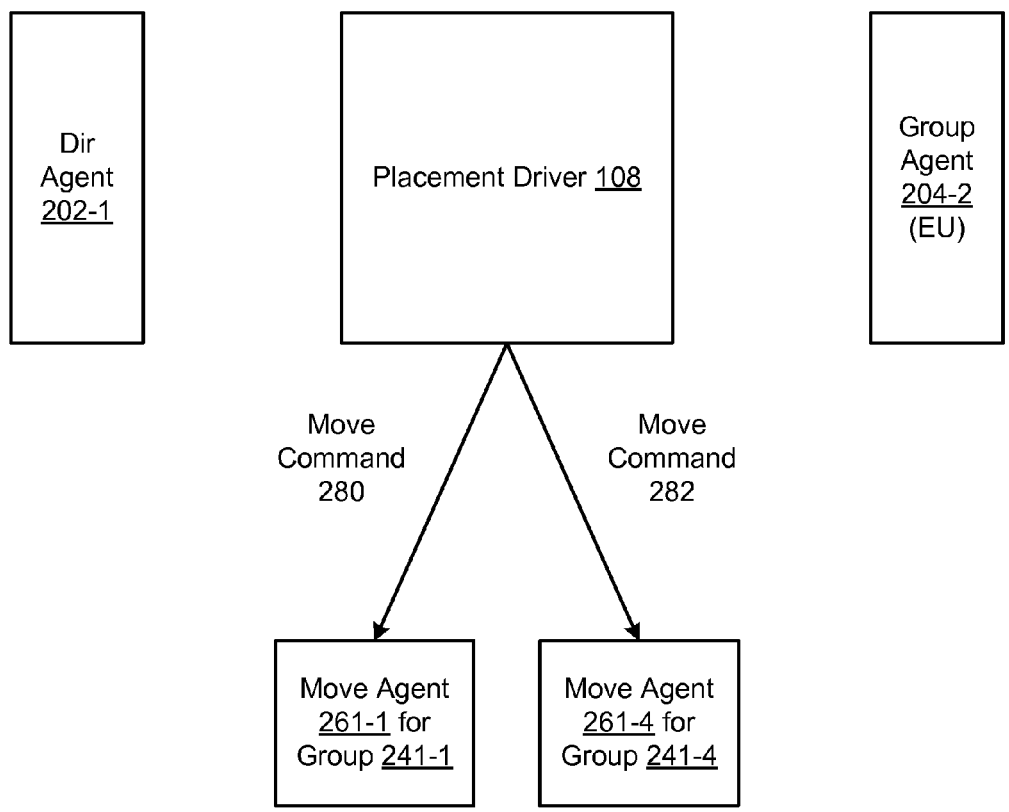
FIG. 2D is a block diagram illustrating data and commands used for moving the data between storage groups illustrated in FIGS. 2A and 2B, according to some embodiments.

In some embodiments, a move proposal only specifies the directory and the splits to be moved and the desired placement of the splits. In this example, the move proposal 270 includes identifiers for the directory 220-1 and the splits 230-1 and 230-2, and an identifier for the EU region. In order to perform (or execute the move proposal), the distributed storage system 100 determines the storage groups into which the splits 230-1 and 230-2 are to be stored. FIGS. 2C and 2D illustrate, at a conceptual level, the data and commands that are performed in order to perform (or execute) a particular move proposal. The mechanics of performing move proposals are discussed with reference to FIGS. 9-25.

In some embodiments, the placement driver 108 obtains move proposals from queues maintained directory agents in the distributed storage system. These embodiments are described in more detail below with reference to FIGS. 17-25. In the example illustrated in FIG. 2C, the placement driver 108 requests move proposals from the queue maintained by the directory agent 202-1. As illustrated in FIG. 2C, in response to the request the placement driver 108 receives the move proposal 270 from the directory agent 202-1 and issues a group identification request 272 to the group agent 204-2 (e.g., the group agent associated with the EU region) requesting that the group agent 204-2 identify storage groups 274 into which the splits 230-1 and 230-2 are to be stored. In some embodiments, the group identification request 272 includes the sizes of the splits 230-1 and 230-2. Based on the current amount of storage space used by data in the storage groups 241 and the sizes of the splits 230-1 and 230-2, the group agent 204-2 determines that the split 230-1 is to be stored in the storage group 241-4 and the split 230-2 is to be stored in the storage group 241-1 (see FIG. 2B). After receiving the storage groups 274 (e.g., the identifier for the storage group 241-4 for the split 230-1 and the identifier for the storage group 241-1 for the split 230-2), the placement driver 108 issues move commands 280 and 282 to move agent 261-1 for the storage group 241-1 and move agent 261-4 for the storage group 241-1, as illustrated in FIG. 2D. The move command 280 instructs the move agent 261-1 for the storage group 241-1 to move the split 230-2 to the storage group 241-1 and the move command 282 instructs the move agent 261-4 for the storage group 241-4 to move the split 230-2 to the storage group 241-4. A respective move agent for a respective storage group is a module of a server (e.g., a tablet server) that handles move requests for moving data into the respective storage group. After the move agents 261-1 for the storage group 241-1 and the move agent 261-4 for the storage group 241-1 have completed the move commands 280 and 282, respectively, the splits 230-1 and 230-2 are associated with the storage groups 241-4 and 241-1, respectively, as illustrated in FIG. 2B.

Figure 3A:
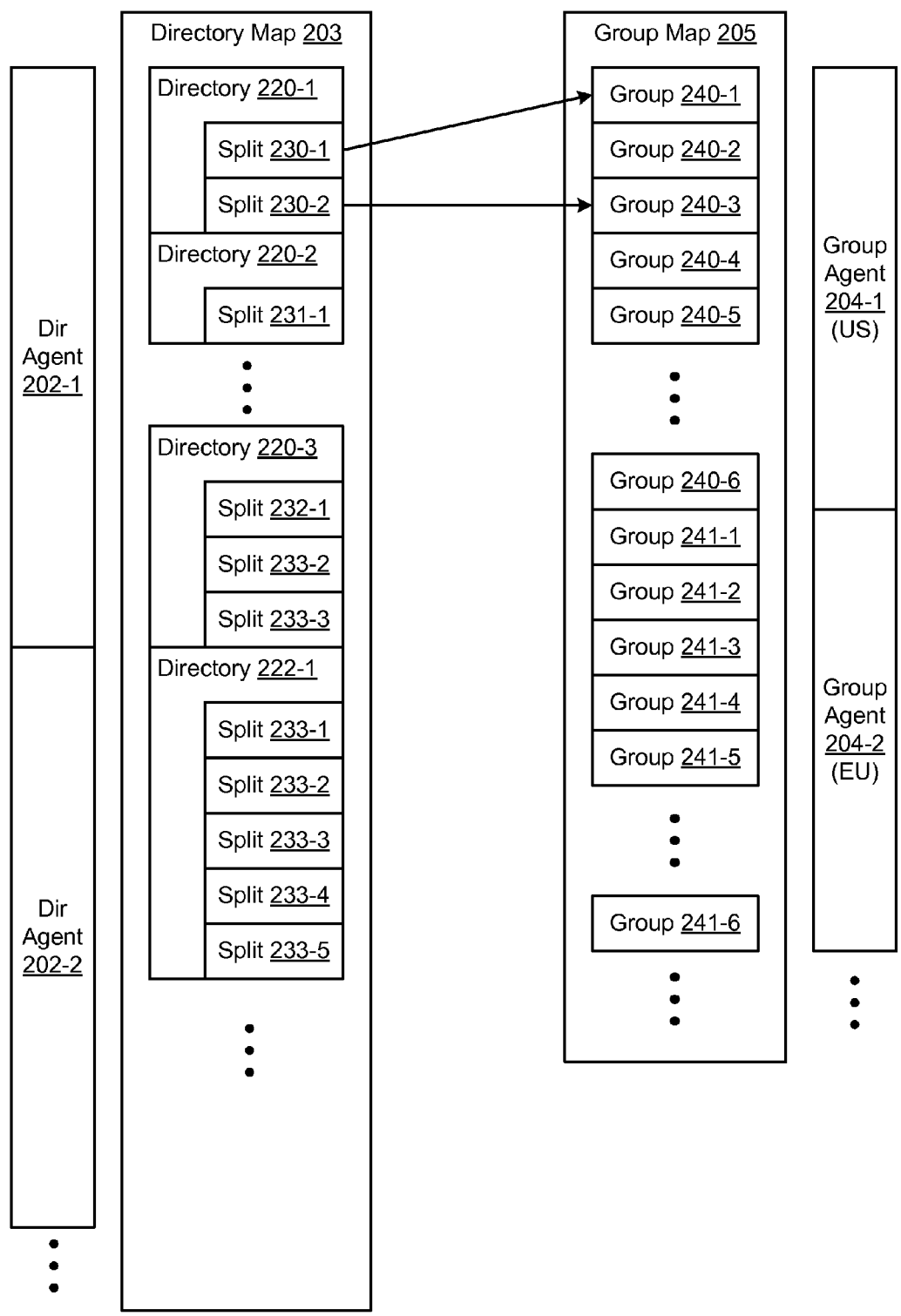
FIG. 3A is a block diagram illustrating another process for moving data between storage groups in a distributed storage system, according to some embodiments.
Figure 3B:
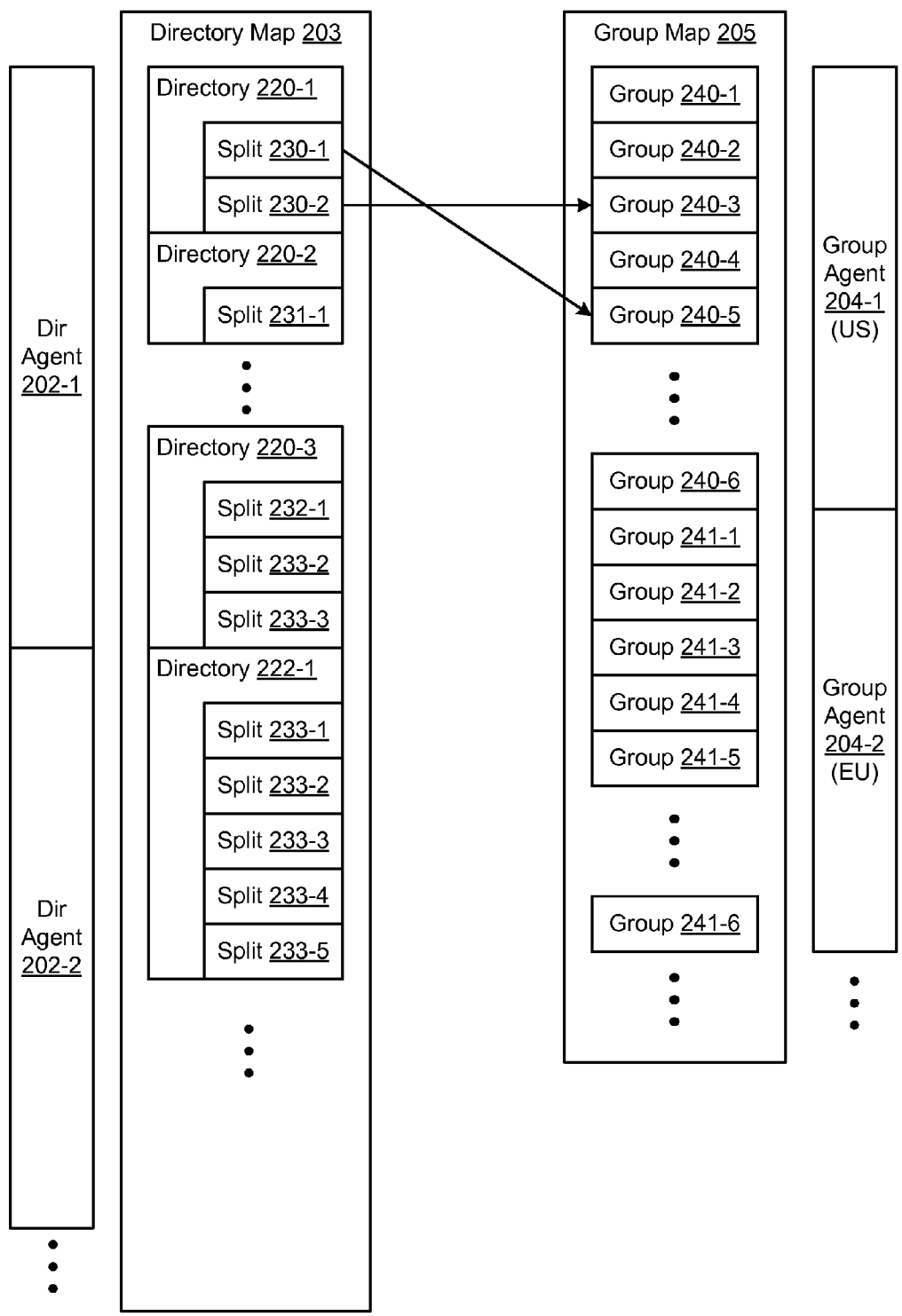
FIG. 3B continues the process illustrated in FIG. 3A, according to some embodiments.
Figure 3C:
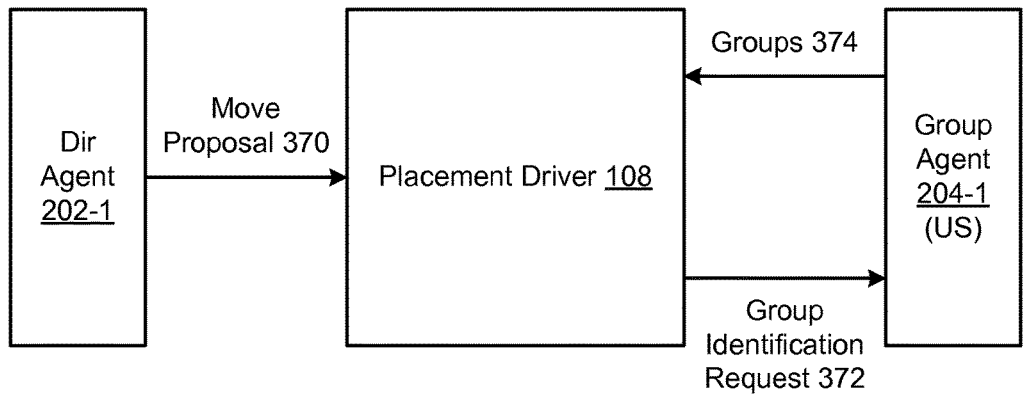
FIG. 3C is a block diagram illustrating data and commands used for moving the data between storage groups illustrated in FIGS. 3A and 3B, according to some embodiments.
Figure 3D:
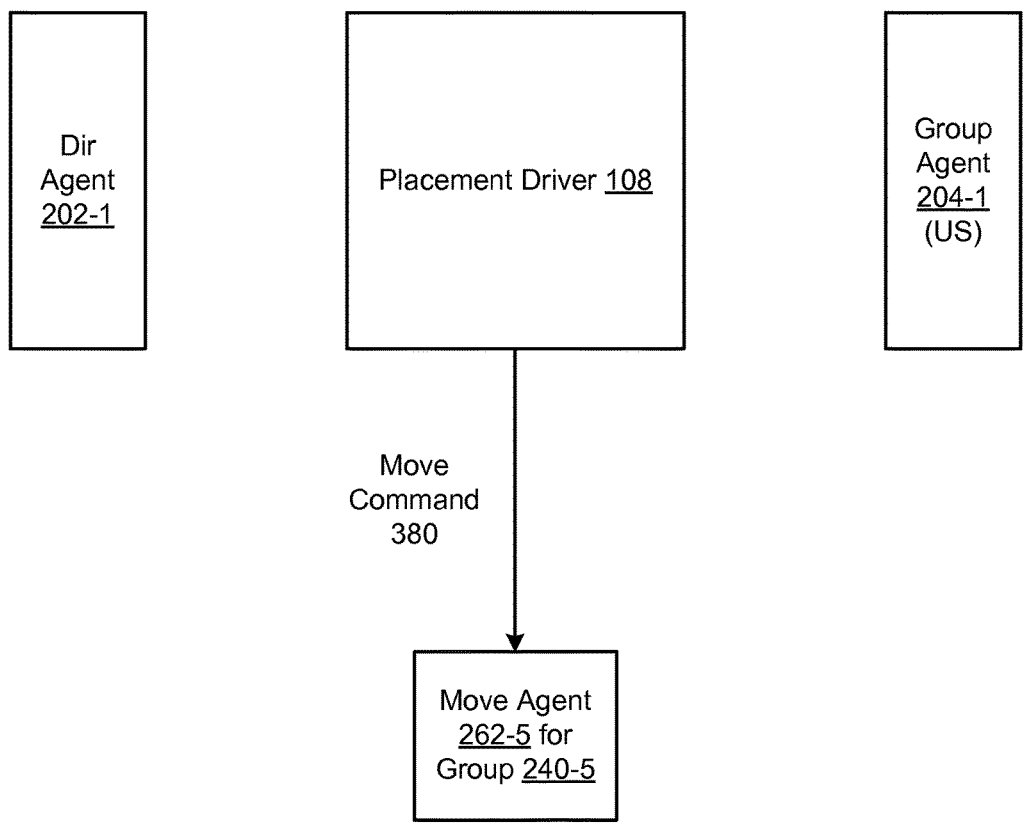
FIG. 3D is a block diagram illustrating data and commands used for moving the data between storage groups illustrated in FIGS. 3A and 3B, according to some embodiments.

In some embodiments, a move proposal to move a split between storage groups in the distributed storage system is generated to balance load in the distributed storage system 100. These embodiments are illustrated in FIGS. 3A-3D. In FIG. 3A, the directory 220-1 has the split 230-1 and the split 230-2. The split 230-1 is associated with the storage group 240-1 and the split 230-2 is associated with the storage group 240-3. In this example, the dir agent 202-1 receives an indication that resource usage load (e.g., storage space, network bandwidth, CPU load, etc.) for the storage group 240-1 storing the split 230-1 exceeds a predetermined threshold. Unlike the example illustrated in FIGS. 2A-2D, the desired placement for data for the directory 220-1 (e.g., the placement of the splits 230-1 and 230-2) is the US region. Accordingly, the dir agent 202-1 generates a move proposal 370 (see FIG. 3C) to move the split 230-1 to another group in the US region. In this example, the move proposal 370 includes identifiers for the directory 220-1 and the split 230-1, and an identifier for the US region. In order to perform (or execute) the move proposal, the distributed storage system 100 determines the storage group into which the split 230-1 is to be stored. FIGS. 3C and 3D illustrate, at a conceptual level, the data and commands that are performed in order to perform (or execute) the move proposal 370. Again, the mechanics of performing move proposals are discussed with reference to FIGS. 9-25.

In FIG. 3C, the placement driver 108 receives the move proposal 370 from the directory agent 202-1 and issues a group identification request 372 to the group agent 204-1 (e.g., the group agent associated with the US region) requesting that the group agent 204-1 identify storage groups 374 into which the split 230-1 is to be stored. Based on the current amount of storage space used by data in the storage groups 240 and the sizes of the split 230-1, the group agent 204-1 determines that the split 230-1 is to be stored in the storage group 240-5 (see FIG. 3B). After receiving the storage groups 374 (e.g., the identifier for the storage group 240-5 for the split 230-1), the placement driver 108 issues a move command 380 to move agent 262-5 for the storage group 240-5, as illustrated in FIG. 3D. The move command 380 instructs the move agent 265-5 for the storage group 240-5 to move the split 230-1 to the storage group 240-5. After the move agent 262-5 for the storage group 240-5 have completed the move command 380, the split 230-1 is associated with the storage groups 240-5, as illustrated in FIG. 3B.

In some embodiments, in addition to determining storage groups into which data is to be stored for move proposals, group agents are also used to determine storage groups into which data for newly-created directories is to be stored.

Figure 4A:
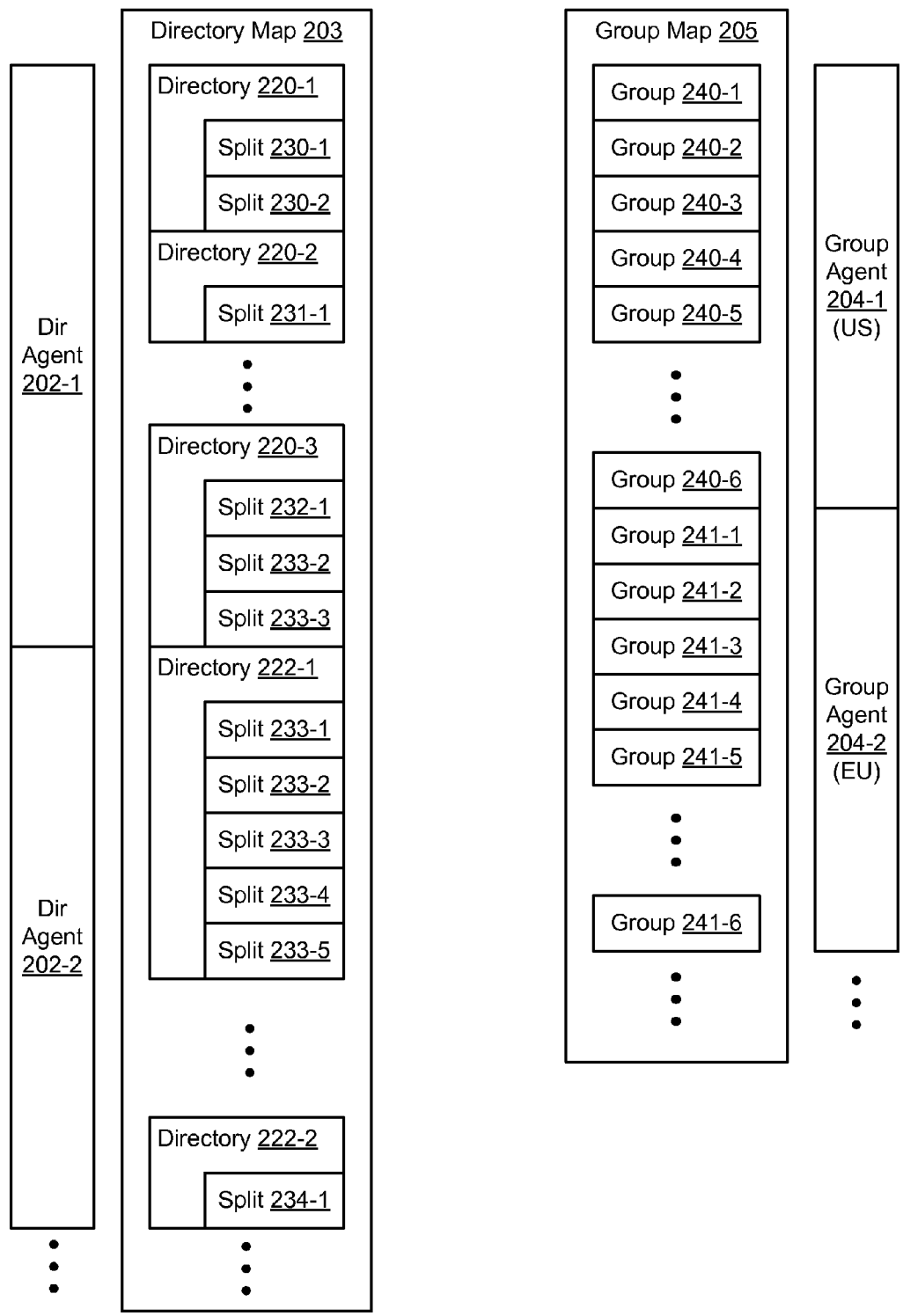
FIG. 4A is a block diagram illustrating a process for creating a new directory and storing data associated with the directory in a storage group in a distributed storage system, according to some embodiments.
Figure 4B:
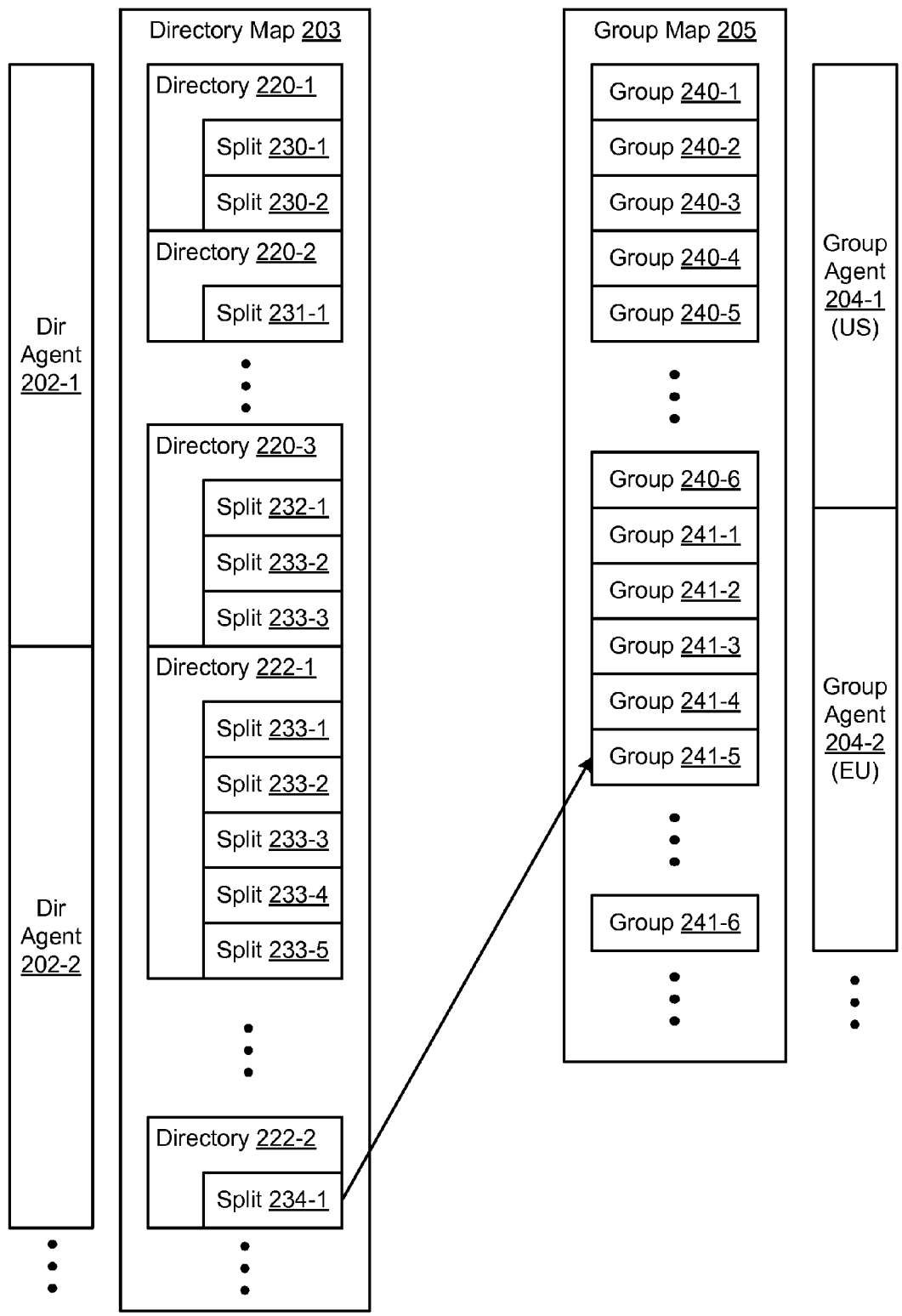
FIG. 4B continues the process illustrated in FIG. 4A, according to some embodiments.
Figure 4C:
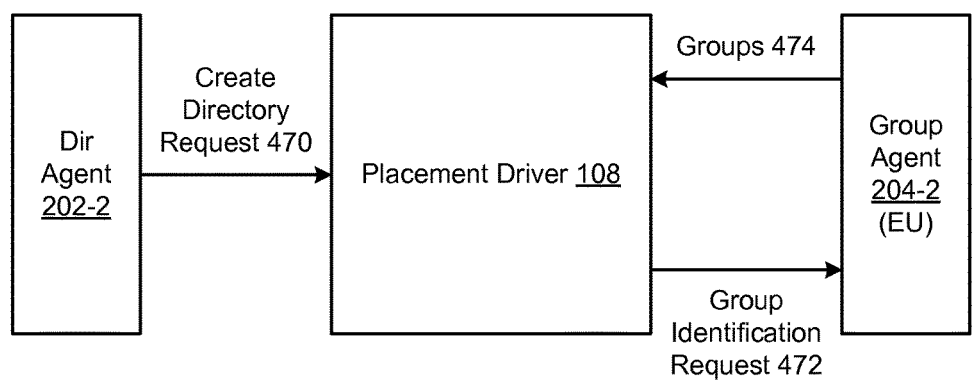
FIG. 4C is a block diagram illustrating data and commands used for creating a new directory and storing data associated with the directory in a storage group illustrated in FIGS. 4A and 4B, according to some embodiments.
Figure 4D:
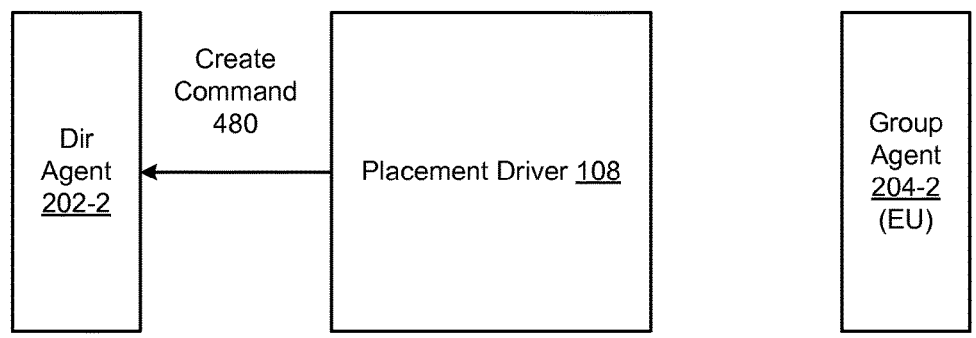
FIG. 4D is a block diagram illustrating data and commands used for creating a new directory and storing data associated with the directory in a storage group illustrated in FIGS. 4A and 4B, according to some embodiments.

These embodiments are illustrated in FIGS. 4A-4D. In FIG. 4A, a directory 222-2 is to be created with a split 234-1 in the EU region. The dir agent 202-2 generates identifiers for the director 222-2 and the split 234-1 and generates a create directory request 470 (see FIG. 4C) to create the directory 222-2 with the split 234-1 in the EU region. In this example, the create directory request 470 includes identifiers for the directory 222-2 and the split 234-1, and an identifier for the EU region. In order to perform (or execute) the create directory request 470, the distributed storage system 100 determines the storage group into which the split 234-1 is to be stored. FIGS. 4C and 4D illustrate, at a conceptual level, the data and commands that are performed in order to perform (or execute) the create directory request 470. The mechanics of performing create directory requests are discussed with reference to FIGS. 9-25.

In FIG. 4C, the placement driver 108 receives the create directory request 470 from the directory agent 202-2 and issues a group identification request 472 to the group agent 204-2 (e.g., the group agent associated with the EU region) requesting that the group agent 204-2 identify storage groups 474 into which the split 234-1 is to be stored. Based on the current amount of storage space used by data in the storage groups 241 and the sizes of the split 234-1, the group agent 204-2 determines that the split 234-1 is to be stored in the storage group 241-5 (see FIG. 4B). After receiving the storage groups 474 (e.g., the identifier for the storage group 241-5 for the split 234-1), the placement driver 108 issues a create command 480 to dir agent 202-2, as illustrated in FIG. 4D. The create command 480 instructs the dir agent 202-2 to store the split 234-1 to the storage group 241-5. After the dir agent 202-2 has completed the create command 480, the split 234-1 is associated with the storage groups 241-5, as illustrated in FIG. 4B.

Figure 5:
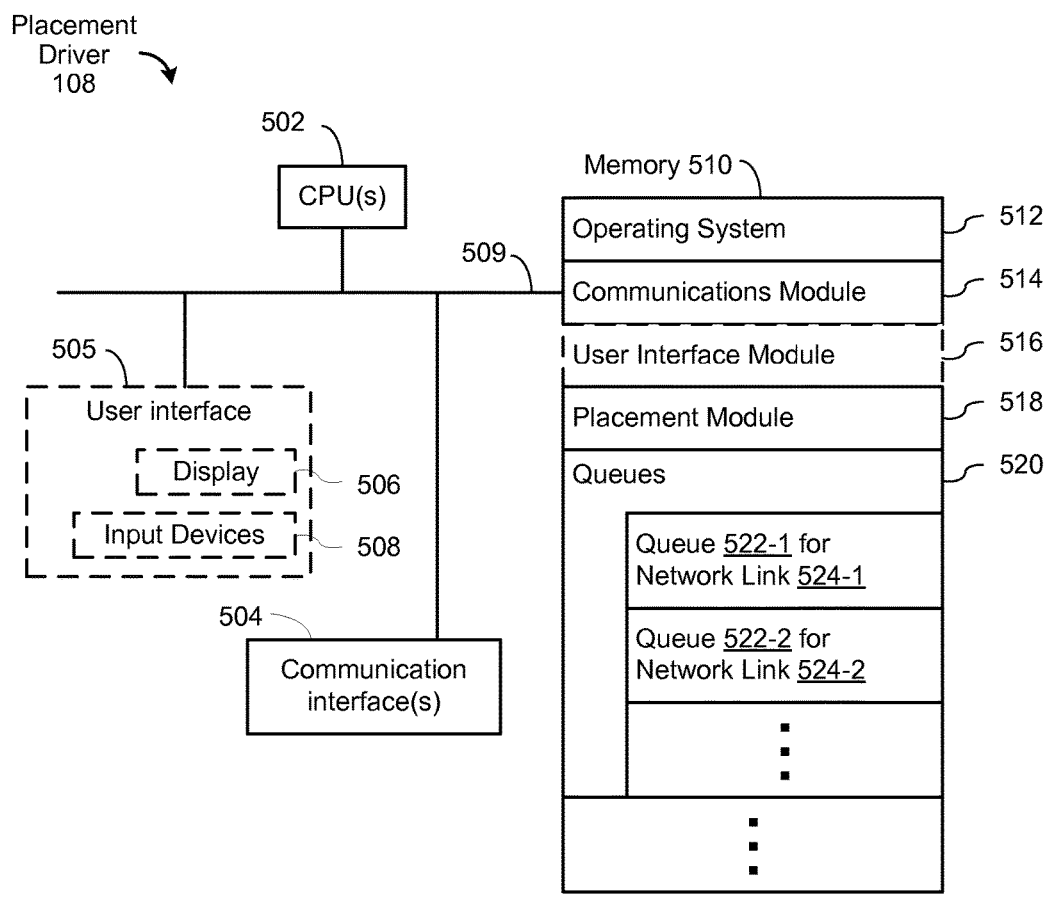
FIG. 5 is a block diagram illustrating a placement driver, according to some embodiments.

FIG. 5 is a block diagram illustrating the placement driver 108, according to some embodiments. The placement driver 108 typically includes one or more processing units (CPU's, sometimes called processors) 502 for executing programs (e.g., programs stored in memory 510), one or more network or other communications interfaces 504, memory 510, and one or more communication buses 509 for interconnecting these components. The communication buses 509 may include circuitry (sometimes called a chipset) that interconnects and controls communications between system components. The placement driver 108 optionally includes (but typically does not include) a user interface 505 comprising a display device 506 and input devices 508 (e.g., keyboard, mouse, touch screen, keypads, etc.). Memory 510 includes high-speed random access memory, such as DRAM, SRAM, DDR RAM or other random access solid state memory devices; and typically includes non-volatile memory, such as one or more magnetic disk storage devices, optical disk storage devices, flash memory devices, or other non-volatile solid state storage devices. Memory 510 optionally includes one or more storage devices remotely located from the CPU(s) 502. Memory 510, or alternately the non-volatile memory device(s) within memory 510, comprises a non-transitory computer readable storage medium. In some embodiments, memory 510 or the computer readable storage medium of memory 510 stores the following programs, modules and data structures, or a subset thereof:

- an operating system 512 that includes procedures for handling various basic system services and for performing hardware dependent tasks;
- a communication module 514 that is used for connecting the placement driver 108 to other computers via the one or more communication interfaces 504 (wired or wireless) and one or more communication networks, such as the Internet, other wide area networks, local area networks, metropolitan area networks, and so on;
- an optional user interface module 516 that receives commands from the user via the input devices 508 and generates user interface objects in the display device 506;
- a placement module that performs (or executes) move proposals and create directory requests, as described herein; and
- queues 520 including queue 522-1 for network link 524-1, queue 522-2 for network link 524-2, etc., as described herein.

In some embodiments, the programs or modules identified above correspond to sets of instructions for performing a function described above. The sets of instructions can be executed by one or more processors (e.g., the CPUs 502). The above identified modules or programs (i.e., sets of instructions) need not be implemented as separate software programs, procedures or modules, and thus various subsets of these programs or modules may be combined or otherwise re-arranged in various embodiments. In some embodiments, memory 510 stores a subset of the modules and data structures identified above. Furthermore, memory 510 may store additional modules and data structures not described above.

Although FIG. 5 shows a "placement driver," FIG. 5 is intended more as functional description of the various features which may be present in a set of servers that implement a placement driver than as a structural schematic of the embodiments described herein. In practice, and as recognized by those of ordinary skill in the art, items shown separately could be combined and some items could be separated. For example, some items shown separately in FIG. 5 could be implemented on single servers and single items could be implemented by one or more servers. The actual number of servers used to implement a placement driver and how features are allocated among them will vary from one embodiment to another, and may depend in part on the amount of data traffic that the system must handle during peak usage periods as well as during average usage periods.

Figure 6:
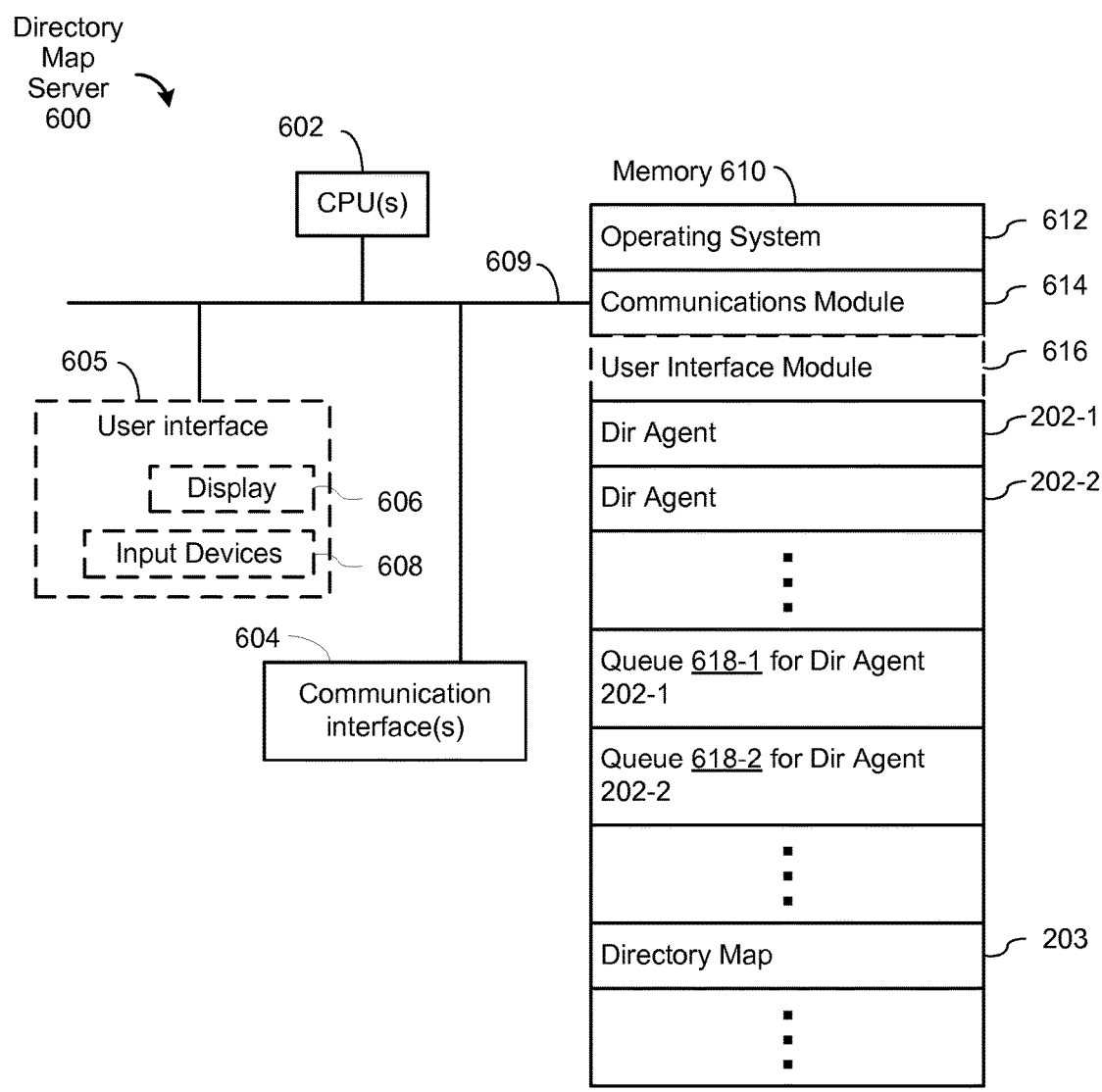
FIG. 6 is a block diagram illustrating a directory map server, according to some embodiments.

FIG. 6 is a block diagram illustrating a directory map server 600, according to some embodiments. In some embodiments, the directory map server 600 is a tablet server. The directory map server 600 typically includes one or more processing units (CPU's, sometimes called processors) 602 for executing programs (e.g., programs stored in memory 610), one or more network or other communications interfaces 604, memory 610, and one or more communication buses 609 for interconnecting these components. The communication buses 609 may include circuitry (sometimes called a chipset) that interconnects and controls communications between system components. The directory map server 600 optionally includes (but typically does not include) a user interface 605 comprising a display device 606 and input devices 608 (e.g., keyboard, mouse, touch screen, keypads, etc.). Memory 610 includes high-speed random access memory, such as DRAM, SRAM, DDR RAM or other random access solid state memory devices; and typically includes non-volatile memory, such as one or more magnetic disk storage devices, optical disk storage devices, flash memory devices, or other non-volatile solid state storage devices. Memory 610 optionally includes one or more storage devices remotely located from the CPU(s) 602. Memory 610, or alternately the non-volatile memory device(s) within memory 610, comprises a non-transitory computer readable storage medium. In some embodiments, memory 610 or the computer readable storage medium of memory 610 stores the following programs, modules and data structures, or a subset thereof:

- an operating system 612 that includes procedures for handling various basic system services and for performing hardware dependent tasks;
- a communication module 614 that is used for connecting the directory map server 600 to other computers via the one or more communication interfaces 604 (wired or wireless) and one or more communication networks, such as the Internet, other wide area networks, local area networks, metropolitan area networks, and so on;
- an optional user interface module 616 that receives commands from the user via the input devices 608 and generates user interface objects in the display device 606;
- dir agents 202 including the dir agent 202-1, 202-2, etc., as described herein;
- queues 618, including queue 618-1, 618-2, etc., that store move proposals, as described herein; and
- the directory map 203, as described herein.

In some embodiments, the dir agents 202 agents are distributed across multiple directory map servers. For example, each directory agent 202 may be included in a separate and distinct directory map server.

In some embodiments, the queues 618 are distributed across multiple directory map servers. For example, each queue 618 may be included in a separate and distinct directory map server. In these embodiments, a respective queue for a respective dir agent is included in the same directory map server.

In some embodiments, the directory map 203 included in the memory 610 is a cached version of the directory map 203. In some embodiments, the directory map 203 included in the memory 610 is a portion of the directory map 203 that corresponds to directory agents 202 included in the directory map server 600.

In some embodiments, the programs or modules identified above correspond to sets of instructions for performing a function described above. The sets of instructions can be executed by one or more processors (e.g., the CPUs 602). The above identified modules or programs (i.e., sets of instructions) need not be implemented as separate software programs, procedures or modules, and thus various subsets of these programs or modules may be combined or otherwise re-arranged in various embodiments. In some embodiments, memory 610 stores a subset of the modules and data structures identified above. Furthermore, memory 610 may store additional modules and data structures not described above.

Although FIG. 6 shows a "directory map server," FIG. 6 is intended more as functional description of the various features which may be present in a set of directory map servers than as a structural schematic of the embodiments described herein. In practice, and as recognized by those of ordinary skill in the art, items shown separately could be combined and some items could be separated. For example, some items shown separately in FIG. 6 could be implemented on single servers and single items could be implemented by one or more servers. The actual number of servers used to implement a directory map server and how features are allocated among them will vary from one embodiment to another, and may depend in part on the amount of data traffic that the system must handle during peak usage periods as well as during average usage periods.

Figure 7:
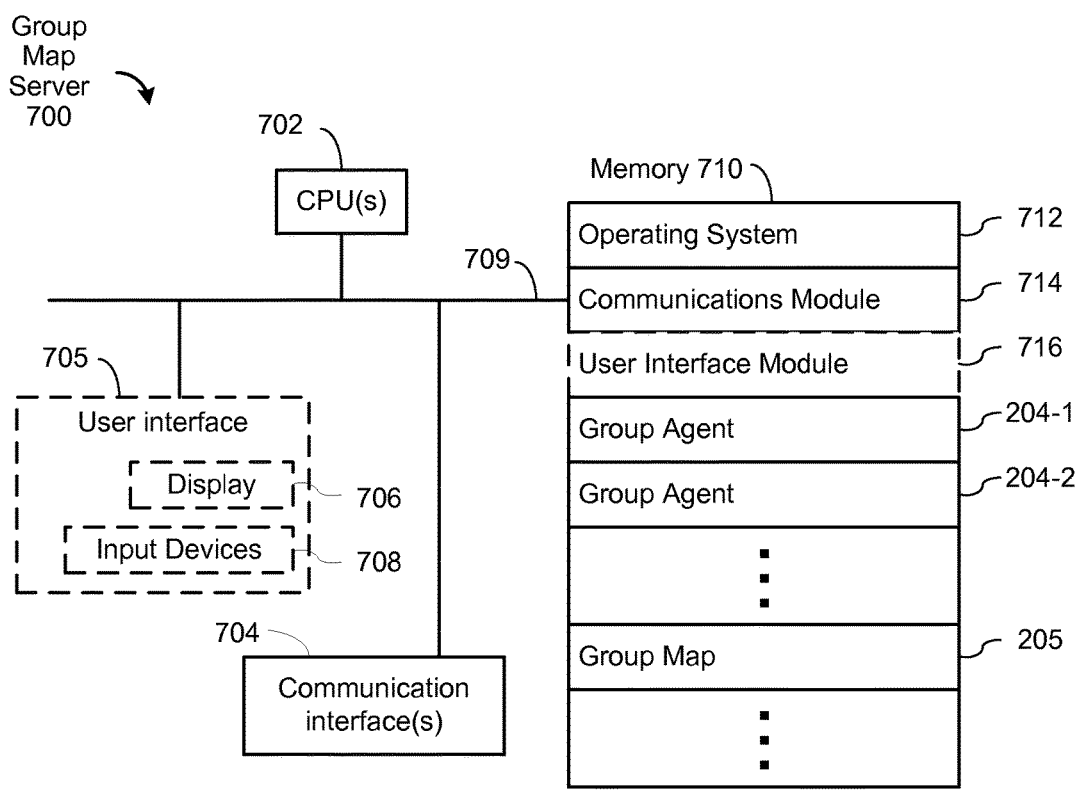
FIG. 7 is a block diagram illustrating a group map server, according to some embodiments.

FIG. 7 is a block diagram illustrating a group map server 700, according to some embodiments. The group map server 700 typically includes one or more processing units (CPU's, sometimes called processors) 702 for executing programs (e.g., programs stored in memory 710), one or more network or other communications interfaces 704, memory 710, and one or more communication buses 709 for interconnecting these components. The communication buses 709 may include circuitry (sometimes called a chipset) that interconnects and controls communications between system components. The group map server 700 optionally includes (but typically does not include) a user interface 705 comprising a display device 706 and input devices 708 (e.g., keyboard, mouse, touch screen, keypads, etc.). Memory 710 includes high-speed random access memory, such as DRAM, SRAM, DDR RAM or other random access solid state memory devices; and typically includes non-volatile memory, such as one or more magnetic disk storage devices, optical disk storage devices, flash memory devices, or other non-volatile solid state storage devices. Memory 710 optionally includes one or more storage devices remotely located from the CPU(s) 702. Memory 710, or alternately the non-volatile memory device(s) within memory 710, comprises a non-transitory computer readable storage medium. In some embodiments, memory 710 or the computer readable storage medium of memory 710 stores the following programs, modules and data structures, or a subset thereof:

- an operating system 712 that includes procedures for handling various basic system services and for performing hardware dependent tasks;
- a communication module 714 that is used for connecting the group map server 700 to other computers via the one or more communication interfaces 704 (wired or wireless) and one or more communication networks, such as the Internet, other wide area networks, local area networks, metropolitan area networks, and so on;
- an optional user interface module 716 that receives commands from the user via the input devices 708 and generates user interface objects in the display device 706;
- group agents 204 including the group agent 204-1, the group agent 204-2, etc., as described herein; and
- the group map 205, as described herein.

In some embodiments, the group agents 204 agents are distributed across multiple group map servers. For example, each group agent 204 may be included in a separate and distinct group map server.

In some embodiments, the group map 205 included in the memory 710 is a cached version of the group map 205. In some embodiments, the group map 205 included in the memory 710 is a portion of the group map 205 that corresponds to group agents 204 included in the group map server 700.

In some embodiments, the programs or modules identified above correspond to sets of instructions for performing a function described above. The sets of instructions can be executed by one or more processors (e.g., the CPUs 702). The above identified modules or programs (i.e., sets of instructions) need not be implemented as separate software programs, procedures or modules, and thus various subsets of these programs or modules may be combined or otherwise re-arranged in various embodiments. In some embodiments, memory 710 stores a subset of the modules and data structures identified above. Furthermore, memory 710 may store additional modules and data structures not described above.

Although FIG. 7 shows a "group map server," FIG. 7 is intended more as functional description of the various features which may be present in a set of group map servers than as a structural schematic of the embodiments described herein. In practice, and as recognized by those of ordinary skill in the art, items shown separately could be combined and some items could be separated. For example, some items shown separately in FIG. 7 could be implemented on single servers and single items could be implemented by one or more servers. The actual number of servers used to implement a group map server and how features are allocated among them will vary from one embodiment to another, and may depend in part on the amount of data traffic that the system must handle during peak usage periods as well as during average usage periods.

Figure 8:
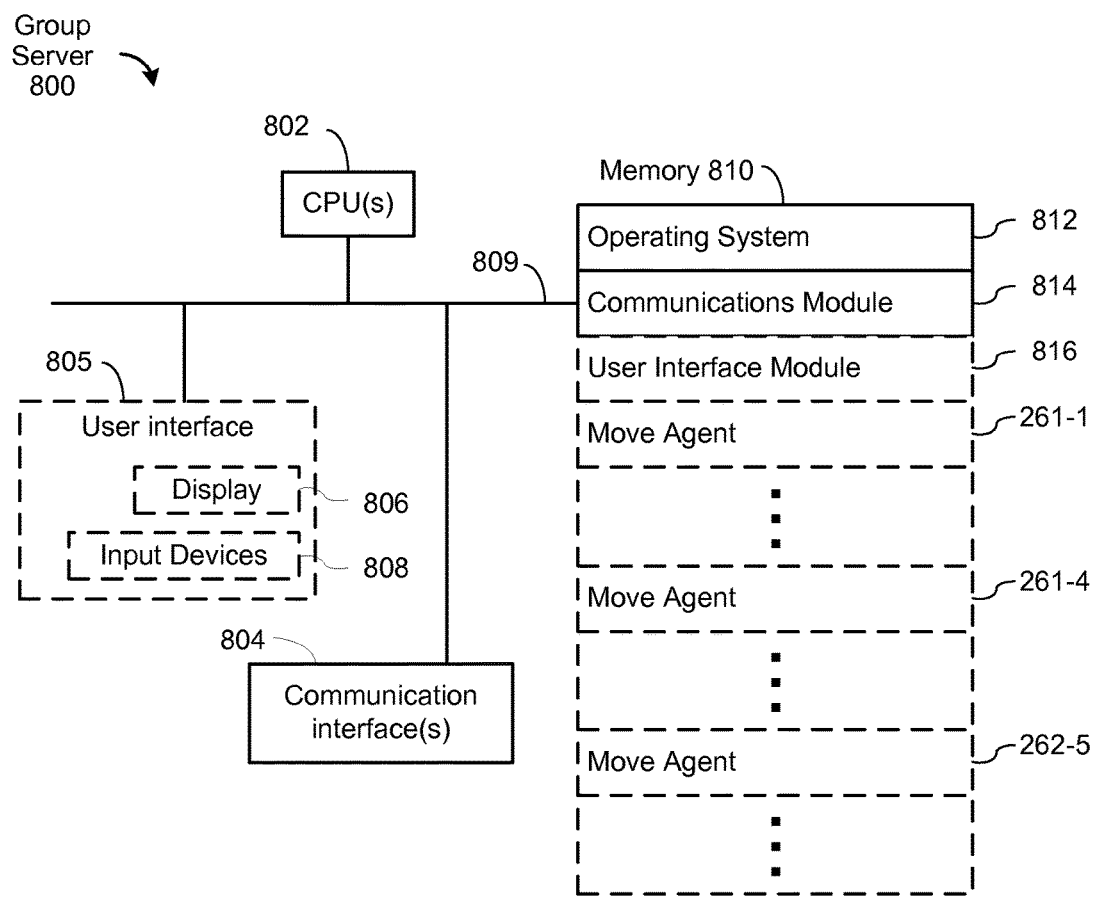
FIG. 8 is a block diagram illustrating a group server, according to some embodiments.

FIG. 8 is a block diagram illustrating a group server 800, according to some embodiments. The X 800 typically includes one or more processing units (CPU's, sometimes called processors) 802 for executing programs (e.g., programs stored in memory 810), one or more network or other communications interfaces 804, memory 810, and one or more communication buses 809 for interconnecting these components. The communication buses 809 may include circuitry (sometimes called a chipset) that interconnects and controls communications between system components. The group server 800 optionally includes (but typically does not include) a user interface 805 comprising a display device 806 and input devices 808 (e.g., keyboard, mouse, touch screen, keypads, etc.). Memory 810 includes high-speed random access memory, such as DRAM, SRAM, DDR RAM or other random access solid state memory devices; and typically includes non-volatile memory, such as one or more magnetic disk storage devices, optical disk storage devices, flash memory devices, or other non-volatile solid state storage devices. Memory 810 optionally includes one or more storage devices remotely located from the CPU(s) 802. Memory 810, or alternately the non-volatile memory device(s) within memory 810, comprises a non-transitory computer readable storage medium. In some embodiments, memory 810 or the computer readable storage medium of memory 810 stores the following programs, modules and data structures, or a subset thereof:
- an operating system 812 that includes procedures for handling various basic system services and for performing hardware dependent tasks;
- a communication module 814 that is used for connecting the group server 800 to other computers via the one or more communication interfaces 804 (wired or wireless) and one or more communication networks, such as the Internet, other wide area networks, local area networks, metropolitan area networks, and so on;
- an optional user interface module 816 that receives commands from the user via the input devices 808 and generates user interface objects in the display device 806; and
- move agents including the move agent 261-1, the move agent 261-4, the move agent 262-5, etc., as described herein.

In some embodiments, a respective move agent only exists when performing a move proposal (or create directory request).

In some embodiments, the move agents are distributed across group servers. For example, each move agent may be included in a separate and distinct group server.

In some embodiments, the programs or modules identified above correspond to sets of instructions for performing a function described above. The sets of instructions can be executed by one or more processors (e.g., the CPUs 802). The above identified modules or programs (i.e., sets of instructions) need not be implemented as separate software programs, procedures or modules, and thus various subsets of these programs or modules may be combined or otherwise re-arranged in various embodiments. In some embodiments, memory 810 stores a subset of the modules and data structures identified above. Furthermore, memory 810 may store additional modules and data structures not described above.

Although FIG. 8 shows a "group server," FIG. 8 is intended more as functional description of the various features which may be present in a set of group servers than as a structural schematic of the embodiments described herein. In practice, and as recognized by those of ordinary skill in the art, items shown separately could be combined and some items could be separated. For example, some items shown separately in FIG. 8 could be implemented on single servers and single items could be implemented by one or more servers. The actual number of servers used to implement a group server and how features are allocated among them will vary from one embodiment to another, and may depend in part on the amount of data traffic that the system must handle during peak usage periods as well as during average usage periods.

Identifying a Storage Group in a Distributed Storage System into which Data is to be Stored The following discussion refers to the group agent 204-1 of the group map server 700. However, it should be noted that the following discussion may be applied to any group agent of any group map server. Furthermore, the following discussion refers to particular modules of the group map server 700 performing particular operations. However, the operations discussed below may be performed by other modules of the group map server 700.

Figure 9:
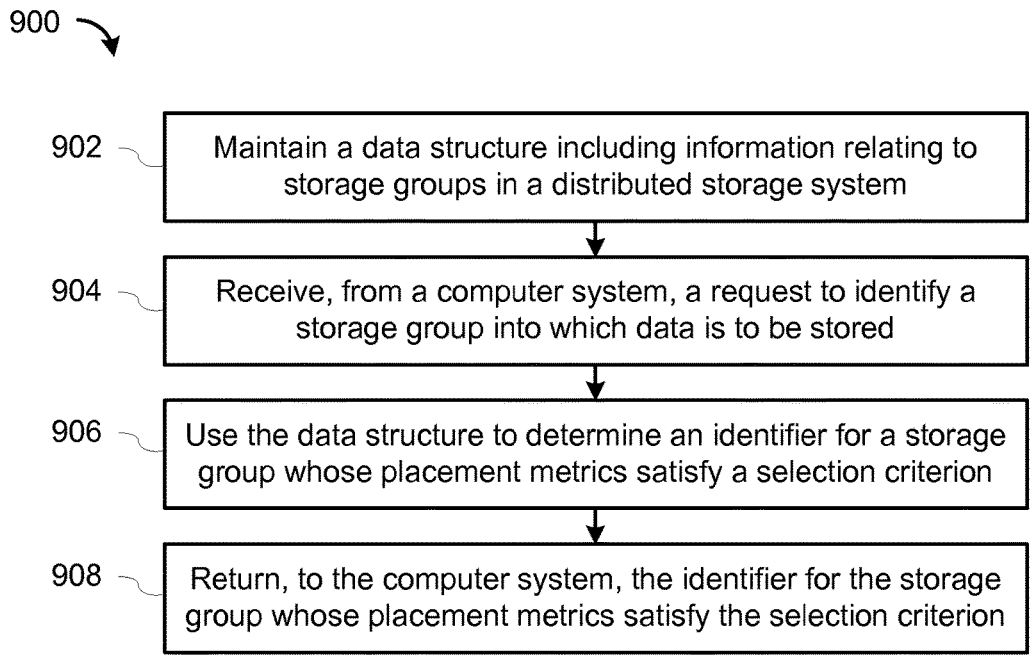
FIG. 9 is a flowchart of a method for identifying a storage group in a distributed storage system into which data is to be stored, according to some embodiments.

FIG. 9 is a flowchart of a method 900 for identifying a storage group in a distributed storage system into which data is to be stored, according to some embodiments.

The group agent 204-1 maintains (902) a data structure including information relating to storage groups in a distributed storage system, where a respective entry in the data structure for a respective storage group includes placement metrics for the respective storage group. In some embodiments, respective placement metrics for a respective storage group include a current amount of storage space being used by the respective storage group to store data. Operation 902 is described in more detail below with reference to FIGS. 12-14.

The group agent 204-1 receives (904), from a computer system, a request to identify a storage group into which data is to be stored. In some embodiments, the computer system is a placement driver that determines placement of data in the distributed storage system (e.g., the placement driver 108). In some embodiments, the computer system is a placement driver that determines placement of data for a plurality of databases in the distributed storage system (e.g., the placement driver 108).

In some embodiments, the request to identify the storage group into which data is to be stored is generated by the computer system in response to receiving new data to be stored in the distributed storage system (e.g., as described above with reference to FIGS. 4A to 4C). In some embodiments, the request to identify the storage group into which data is to be stored is generated by the computer system in response to determining that the data is to be moved from a first storage group in the distributed storage system to a second storage group in the distributed storage system. For example, the determination that the data is to be moved may be made based on a placement policy violation (e.g., the actual placement of a split is in the US region, but the desired location of the split is the EU region). The determination that the data is to be moved may also be made to balance resource usage (e.g., storage capacity, network bandwidth, CPU time, etc.). In some embodiments, the first storage group and the second storage group are in the same geographic region (e.g., the same country). In some embodiments, the first storage group and the second storage group are in different geographic regions.

The group agent 204-1 uses (906) the data structure to determine an identifier for a storage group whose placement metrics satisfy a selection criterion. Operation 906 is described in more detail below with reference to FIG. 10.

The group agent 204-1 returns (908), to the computer system, the identifier for the storage group whose placement metrics satisfy the selection criterion.

Figure 10:
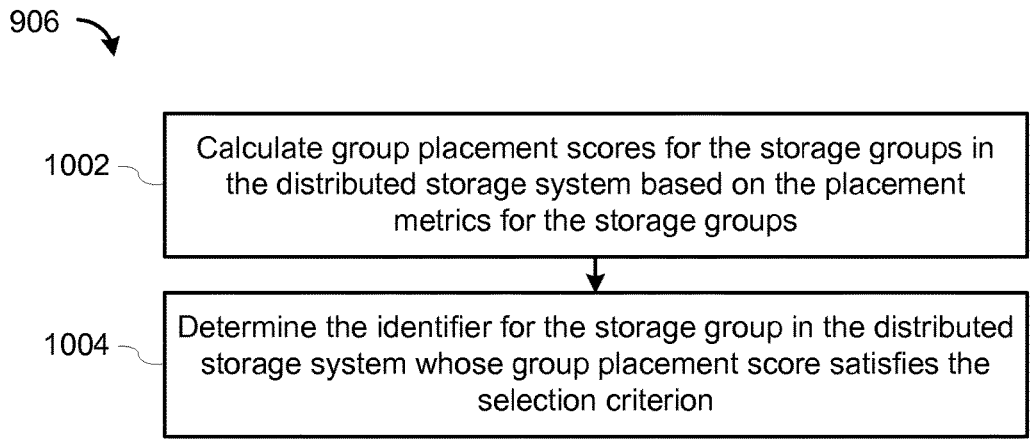
FIG. 10 is a flowchart of a method for using a data structure to determine an identifier for a storage group whose placement metrics satisfy a selection criterion, according to some embodiments.

FIG. 10 is a flowchart of a method for using (906) a data structure to determine an identifier for a storage group whose placement metrics satisfy a selection criterion, according to some embodiments.

The group agent 204-1 calculates (1002) group placement scores for the storage groups in the distributed storage system based on the placement metrics for the storage groups. In some embodiments, a respective group placement score for a respective storage group satisfies the selection criterion when the respective group placement score for the respective storage group is the highest group placement score across all of the storage groups in the distributed storage system. In some embodiments, a respective group placement score for a respective storage group satisfies the selection criterion when the respective group placement score for the respective storage group has the lowest group placement score across all of the storage groups in the distributed storage system. Operation 1002 is described in more detail below with reference to FIG. 11.

The group agent 204-1 then determines (1004) the identifier for the storage group in the distributed storage system whose group placement score satisfies the selection criterion.

Figure 11:
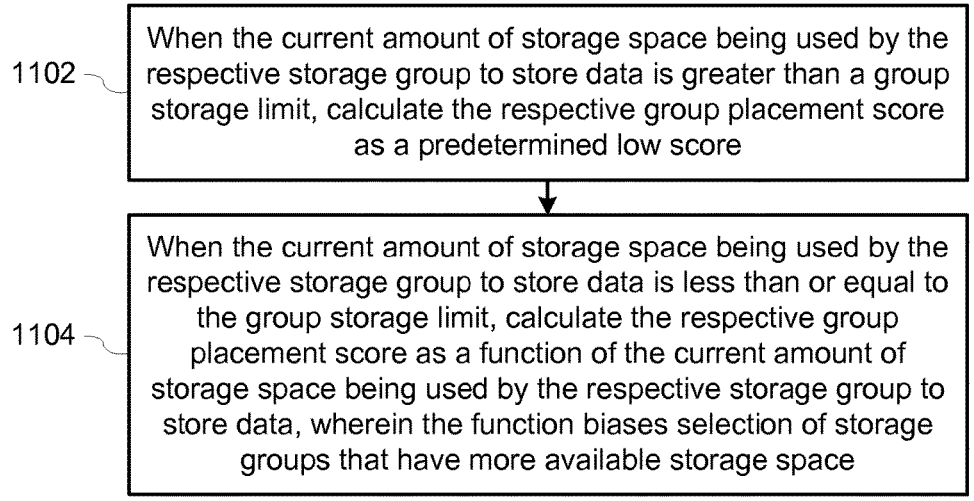
FIG. 11 is a flowchart of a method for calculating a respective group placement score for a respective storage group, according to some embodiments.

FIG. 11 is a flowchart of a method for calculating (1002) a respective group placement score for a respective storage group, according to some embodiments. When the current amount of storage space being used by the respective storage group to store data is greater than a group storage limit, the group agent 204-1 calculates (1102) the respective group placement score as a predetermined low score. In some embodiments, the predetermined low score is zero.

When the current amount of storage space being used by the respective storage group to store data is less than or equal to the group storage limit, the group agent 204-1 calculates (1104) the respective group placement score as a function of the current amount of storage space being used by the respective storage group to store data, wherein the function biases selection of storage groups that have more available storage space. In some embodiments, the function is $(200-(100*S)/S_{max})$, where S is the current amount of storage space being used by the respective storage group to store data and $S_{max}$ is the group storage limit.

Figure 12:
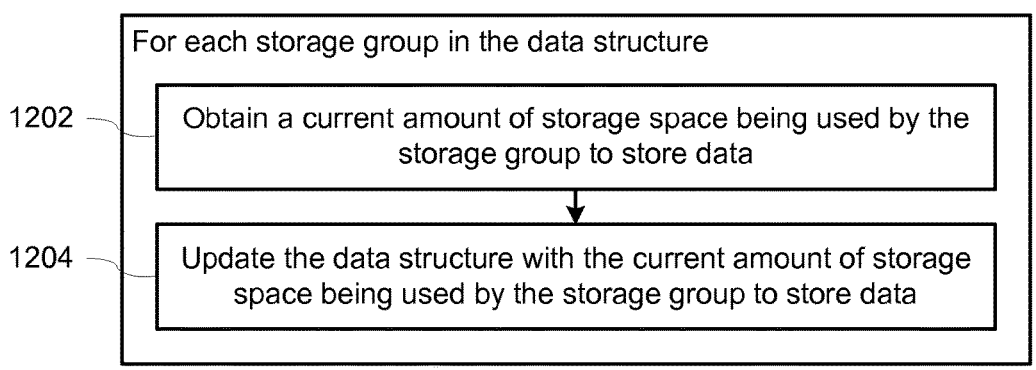
FIG. 12 is a flowchart of a method for maintaining a data structure including information relating to storage groups in a distributed storage system, according to some embodiments.

FIG. 12 is a flowchart of a method for maintaining (902) a data structure including information relating to storage groups in a distributed storage system, according to some embodiments. For each storage group in the data structure, the group agent 204-1 obtains (1202) a current amount of storage space being used by the storage group to store data and updates (1204) the data structure with the current amount of storage space being used by the storage group to store data.

Figure 13:
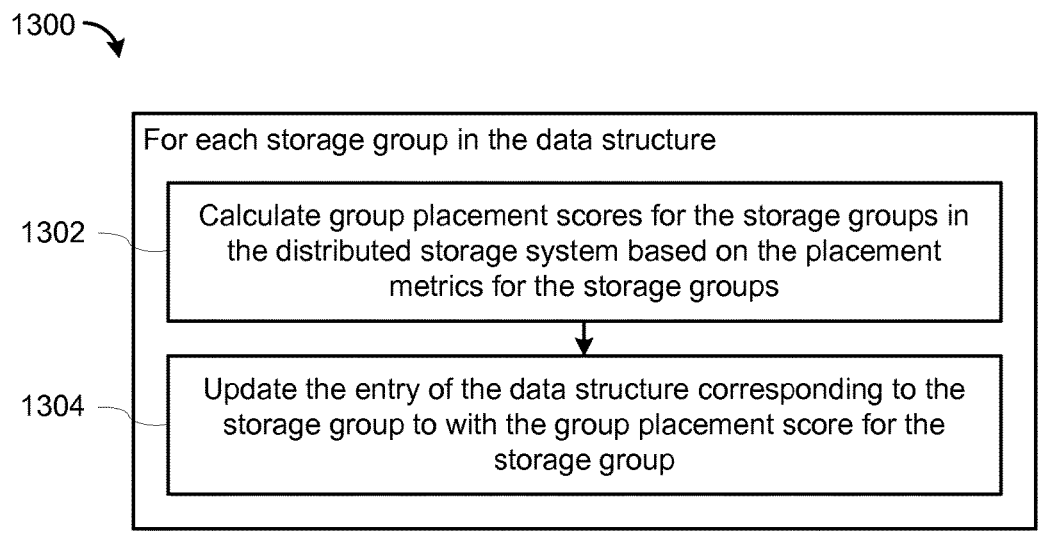
FIG. 13 is a flowchart of a method for updating an entry of a data structure corresponding to a storage group with a group placement score for a storage group, according to some embodiments.

FIG. 13 is a flowchart of a method 1300 for updating an entry of a data structure corresponding to a storage group with a group placement score for a storage group, according to some embodiments. For each storage group in the data structure, the group agent 204-1 calculates (1302) group placement scores for the storage groups in the distributed storage system based on the placement metrics for the storage groups and updates (1304) the entry of the data structure corresponding to the storage group with the group placement score for the storage group.

Figure 14:
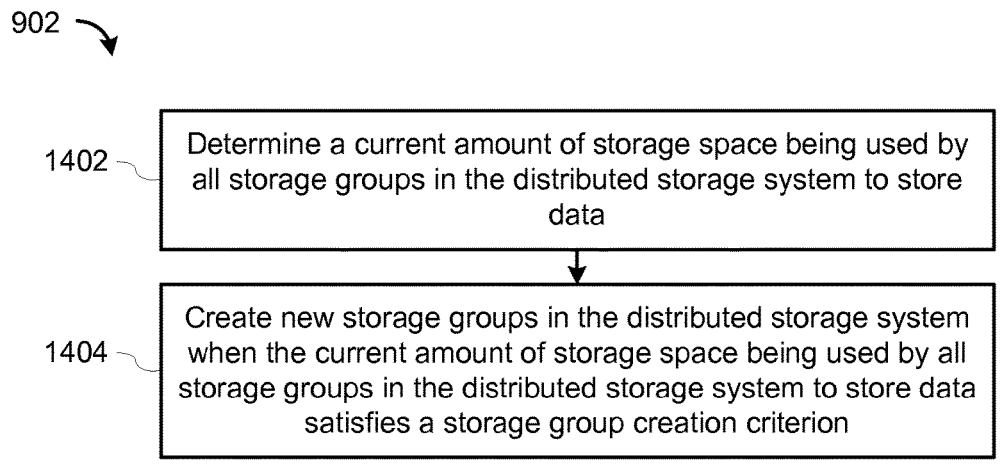
FIG. 14 is a flowchart of a method for maintaining a data structure including information relating to storage groups in a distributed storage system, according to some embodiments.

FIG. 14 is a flowchart of a method for maintaining (902) a data structure including information relating to storage groups in a distributed storage system, according to some embodiments. The group agent 204-1 determines (1402) a current amount of storage space being used by all storage groups in the distributed storage system to store data and creates (1404) new storage groups in the distributed storage system when the current amount of storage space being used by all storage groups in the distributed storage system to store data satisfies a storage group creation criterion.

In some embodiments, the storage group creation criterion is satisfied when the current amount of storage space being used by all storage groups T satisfies the storage group creation criterion is greater than or equal to a global storage group limit F (e.g., T>=F). In some embodiments, the global storage group limit F is a function of a total number of storage groups in the distributed storage system N, a group storage limit $S_{max}$, and a predetermined factor H (e.g., a high watermark factor, 0.75). For example, the function may be $F=N*S_{max}*H$.

In some embodiments, a number of new storage groups that are created is a function of the current amount of storage space being used by all storage groups T in the distributed storage system to store data, a target group size S, and a total number of storage groups in the distributed storage system N. In some embodiments, the function is (T/S−N+1). In some embodiments, the target group size S is a function of a group size limit $S_{max}$ and a predetermined factor L (e.g., a low watermark factor, 0.7). For example, $S=S_{max}*L$.

In some embodiments, the new storage groups are created using a background process and is not created in response to the request to identify the storage group into which data is to be stored.

Moving Data Between Storage Groups in a Distributed Storage System

The following discussion refers to the move agent 261-1 of the group server 800. However, it should be noted that the following discussion may be applied to any move agent of any group server. Furthermore, the following discussion refers to particular modules of the group server 800 performing particular operations. However, the operations discussed below may be performed by other modules of the group server 800.

Figure 15:
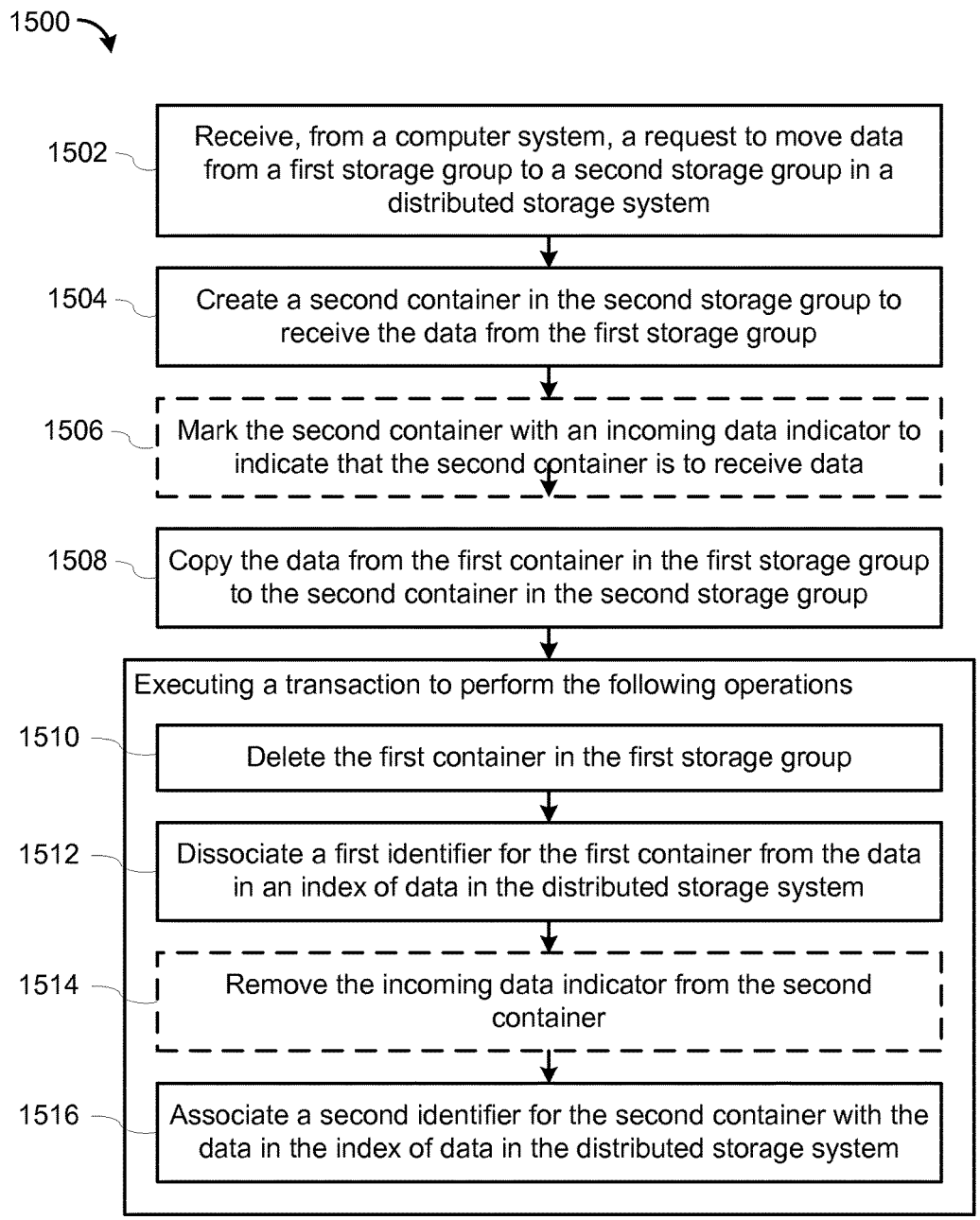
FIG. 15 is a flowchart of a method for moving data between storage groups in a distributed storage system, according to some embodiments.

FIG. 15 is a flowchart of a method 1500 for moving data between storage groups in a distributed storage system, according to some embodiments. The move agent 261-1 receives (1502), from a computer system, a request to move data from a first storage group to a second storage group in a distributed storage system. In some embodiments, the request includes the first identifier of the first storage group, the second identifier of the second storage group, and the first identifier for the first container.

The move agent 261-1 creates (1504) a second container in the second storage group to receive the data from the first storage group.

In some embodiments, the move agent 261-1 optionally marks (1506) the second container with an incoming data indicator to indicate that the second container is to receive data.

The move agent 261-1 copies (1508) the data from the first container in the first storage group to the second container in the second storage group.

The move agent 261-1 executes a transaction to perform the following operations: the move agent 261-1 deletes (1510) the first container in the first storage group, dissociates (1512) a first identifier for the first container from the data in an index of data in the distributed storage system (e.g., the directory map 203), optionally removes (1514) the incoming data indicator from the second container (e.g., when the operation 1506 is performed), and associates (1516) a second identifier for the second container with the data in the index of data in the distributed storage system. In some embodiments, the index of data includes a plurality of directories, wherein a respective directory includes at least one container for data. In some embodiments, the at least one container for data is a directory split.

In some embodiments, the data is accessible from the first storage group until all the operations of the transaction are successfully performed. In some embodiments, the data is accessible from the second storage group only after all of the operations of the transaction are successfully performed.

In some embodiments, the server is a server for the second storage group (e.g., the storage group receiving the data to be moved).

Figure 16:
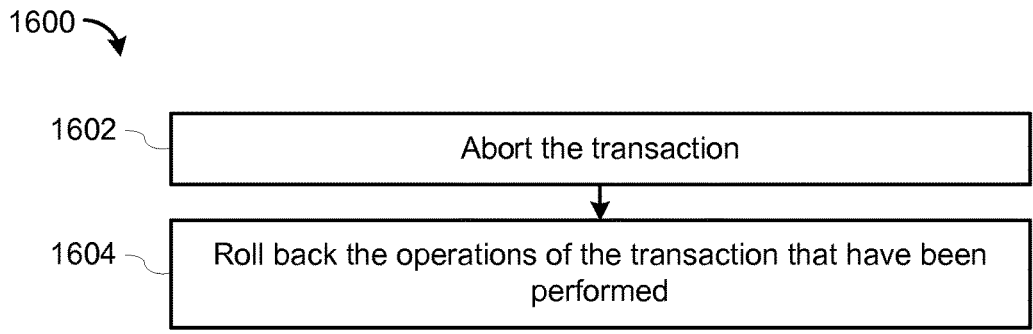
FIG. 16 is a flowchart of a method for aborting a transaction, according to some embodiments.

In some embodiments, when any operation of the transaction fails, the move agent 261-1 aborts the transaction. FIG. 16 is a flowchart of a method 1600 for aborting a transaction, according to some embodiments. The move agent 261-1 aborts (1602) the transaction and rolls (1604) back the operations of the transaction that have been performed.

Scheduling Moves of Data Between Storage Groups in a Distributed Storage System

The following discussion refers to the placement module 518 of the placement driver 108. However, it should be noted that the following discussion may be applied to any placement module of any placement driver. Furthermore, the following discussion refers to particular modules of the placement driver 108 performing particular operations. However, the operations discussed below may be performed by other modules of the placement driver 108.

Figure 17:
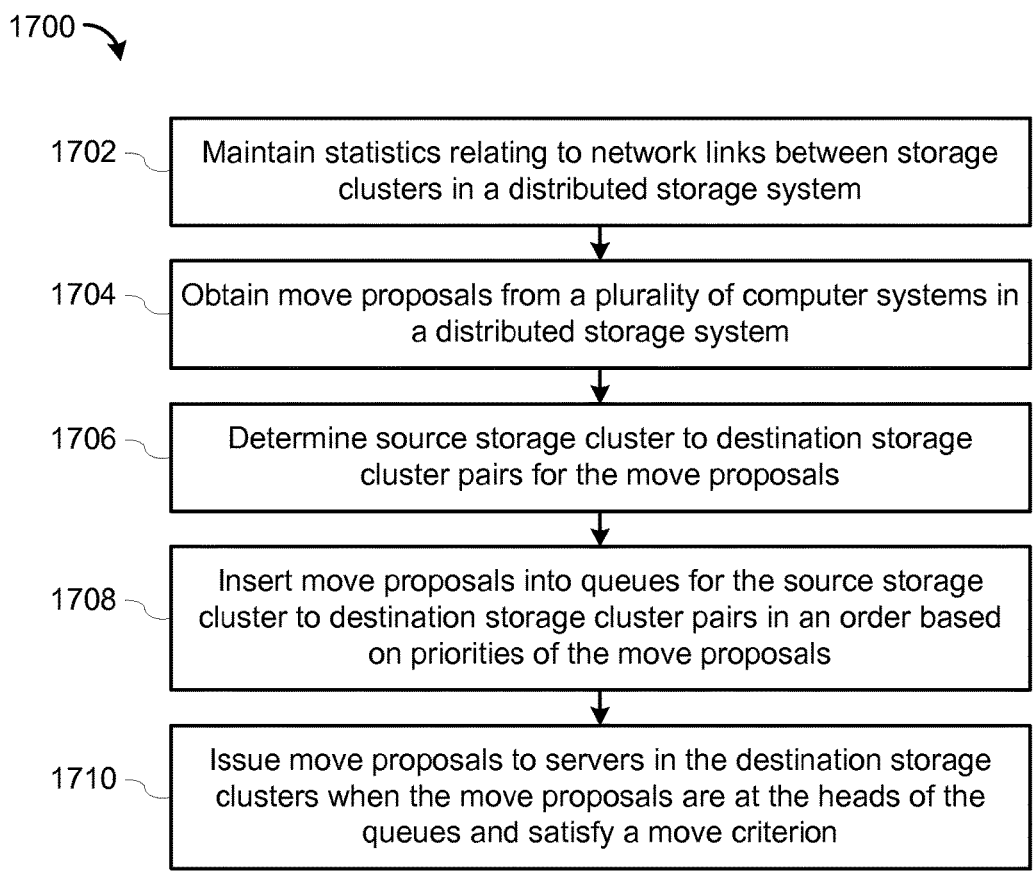
FIG. 17 is a flowchart of a method for scheduling moves of data between storage groups in a distributed storage system, according to some embodiments.

FIG. 17 is a flowchart of a method 1700 for scheduling moves of data between storage groups in a distributed storage system, according to some embodiments. The placement module 518 maintains (1702) statistics relating to network links between storage clusters in a distributed storage system. Operation 1702 is described in more detail below with reference to FIGS. 18-19.

The placement module 518 obtains (1704) move proposals from a plurality of computer systems in a distributed storage system. In some embodiments, a respective move proposal includes an identifier for a container of a source storage group from which data is to be moved, an identifier of a directory in which the container of the source storage group is included, and a desired placement (e.g., US region, EU region, etc.). Operation 1704 is described in more detail below with reference to FIG. 20.

The placement module 518 determines (1706) source storage cluster to destination storage cluster pairs for the move proposals. Operation 1706 is described in more detail below with reference to FIGS. 21-23.

The placement module 518 inserts (1708) move proposals into queues for the source storage cluster to destination storage cluster pairs in an order based on priorities of the move proposals.

The placement module 518 issues (1710) move proposals to servers in the destination storage clusters when the move proposals are at the heads of the queues and satisfy a move criterion. In some embodiments, a respective move proposal satisfies the move criterion when the use of a respective network link associated with the respective move proposal to perform the respective move proposal does not cause the network capacity of the respective network link to decrease below a predetermined minimum network capacity limit. In some embodiments, when the data associated with a respective move proposal is being moved from multiple source storage clusters to multiple destination clusters, and the respective move proposal satisfies the move criterion when the use of a respective network link associated with the respective move proposal to perform the respective move proposal does not cause the network capacity of the respective network link to decrease below a predetermined minimum network capacity limit and the respective move proposal is at the head of all queues associated with the respective move request.

Figure 18:
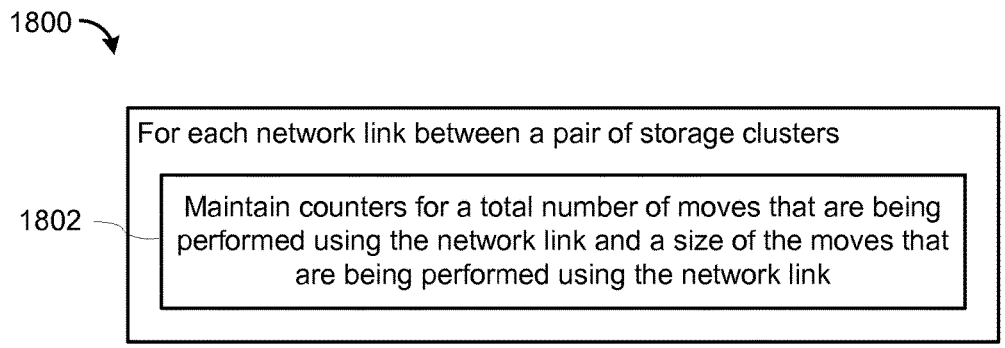
FIG. 18 is a flowchart of a method for maintaining statistics relating to network links between storage clusters in a distributed storage system, according to some embodiments.

FIG. 18 is a flowchart of a method 1800 for maintaining statistics relating to network links between storage clusters in a distributed storage system, according to some embodiments. For each network link between a pair of storage clusters, the placement module 518 maintains (1802) counters for a total number of moves that are being performed using the network link and a size of the moves that are being performed using the network link. Operation 1802 is described in more detail below with reference to FIG. 19.

Figure 19:
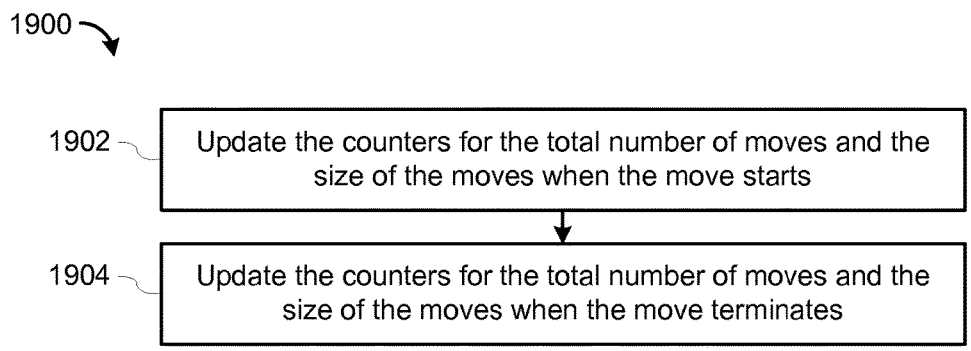
FIG. 19 is a flowchart of a method for maintaining counters for a network link, according to some embodiments.

FIG. 19 is a flowchart of a method 1900 for maintaining counters for a network link, according to some embodiments. The placement module 518 updates (1902) the counters for the total number of moves and the size of the moves when the move starts and updates (1904) the counters for the total number of moves and the size of the moves when the move terminates. Note that the moves may terminate because the moves completed successfully or the moves were aborted.

Figure 20:
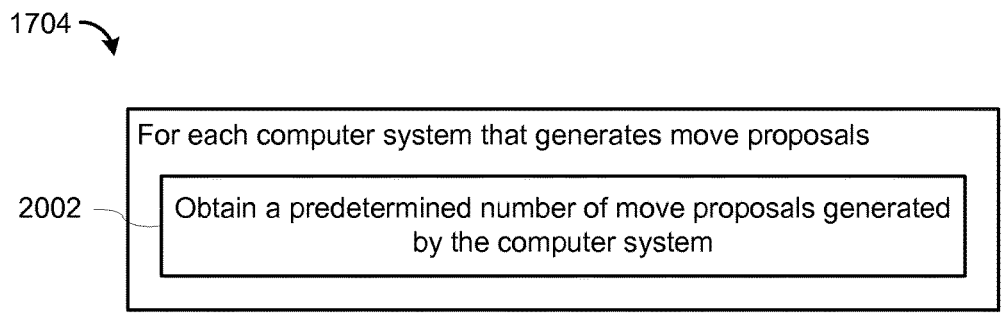
FIG. 20 is a flowchart of a method for obtaining move proposals from a plurality of computer systems in a distributed storage system, according to some embodiments.

FIG. 20 is a flowchart of a method for obtaining move proposals from a plurality of computer systems in a distributed storage system, according to some embodiments. For each computer system that generates move proposals, the placement module 518 obtains (2002) a predetermined number of move proposals generated by the computer system.

Figure 21:
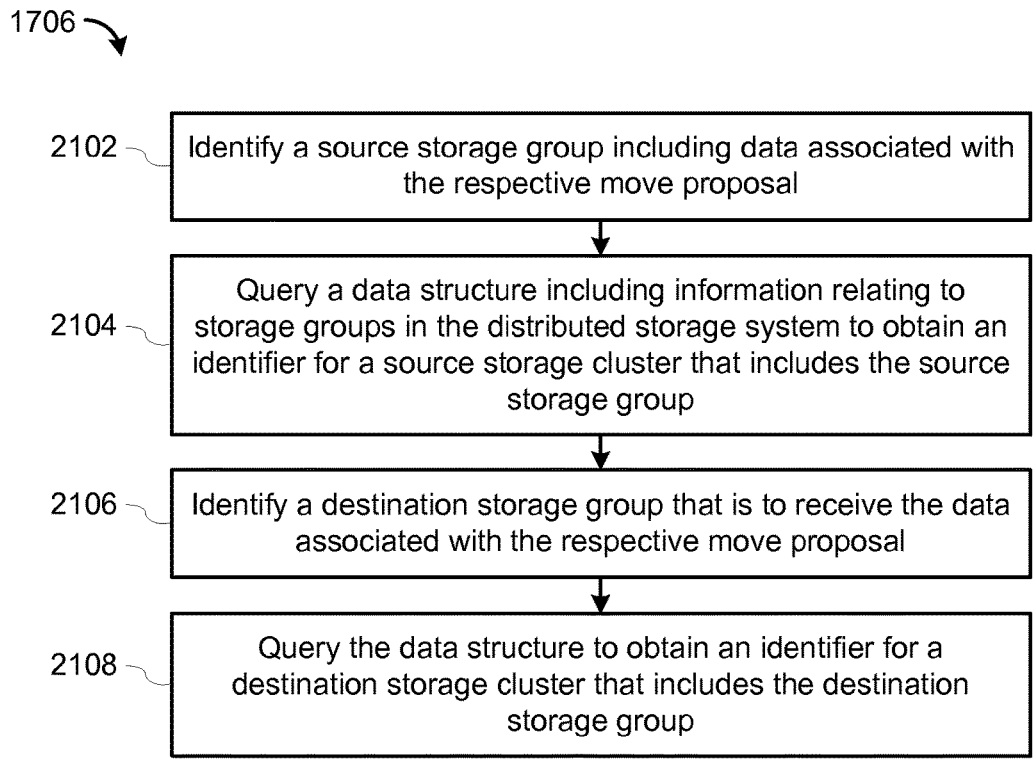
FIG. 21 is a flowchart of a method for determining a respective source storage cluster to destination storage cluster pair for a respective move proposal, according to some embodiments.

FIG. 21 is a flowchart of a method for determining (1706) a respective source storage cluster to destination storage cluster pair for a respective move proposal, according to some embodiments. The placement module 518 identifies (2102) a source storage group including data associated with the respective move proposal. Operation 2102 is described in more detail below with reference to FIG. 22. The placement module 518 then queries (2104) a data structure including information relating to storage groups in the distributed storage system to obtain an identifier for a source storage cluster that includes the source storage group.

The placement module 518 identifies (2106) a destination storage group that is to receive the data associated with the respective move proposal. The placement module 518 queries (2108) the data structure to obtain an identifier for a destination storage cluster that includes the destination storage group. In some embodiments, the placement module 518 identifies the destination storage group that is to receive the data associated with the respective move proposal by using a data structure including information relating to storage groups in the distributed storage system to determine an identifier for a storage group whose placement metrics satisfy a selection criterion. For example, the placement module 518 issues a group identification request (e.g., the group identification request 272) to a group agent to determine the identifier for the storage group whose placement metrics satisfy the selection criterion. The group agent to which the placement module 518 issues the group identification request performs the operations described above with reference to FIG. 9-14.

Figure 22:
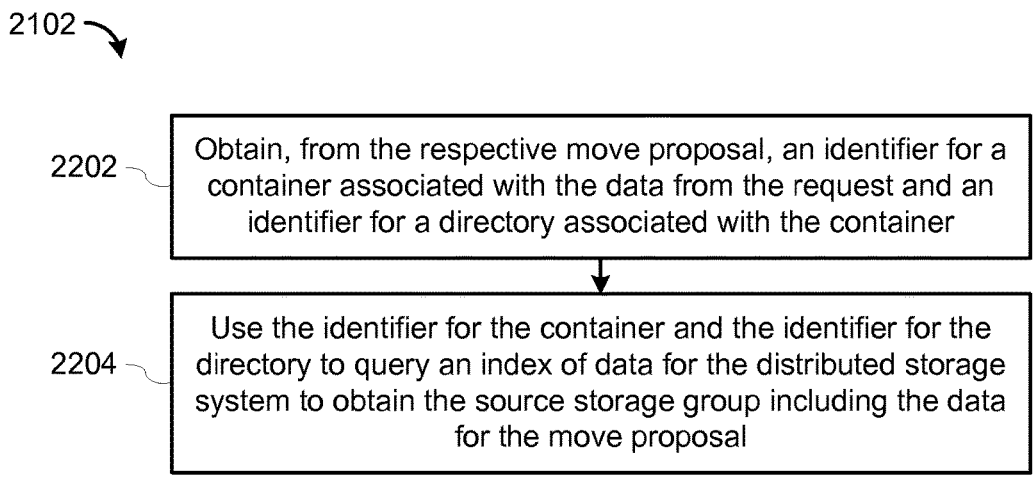
FIG. 22 is a flowchart of a method for identifying a source storage group including data associated with a respective move proposal, according to some embodiments.

FIG. 22 is a flowchart of a method for identifying (2102) a source storage group including data associated with a respective move proposal, according to some embodiments. The placement module 518 obtains (2202), from the respective move proposal, an identifier for a container associated with the data from the request and an identifier for a directory associated with the container and uses (2204) the identifier for the container and the identifier for the directory to query an index of data for the distributed storage system to obtain the source storage group including the data for the move proposal.

Figure 23:
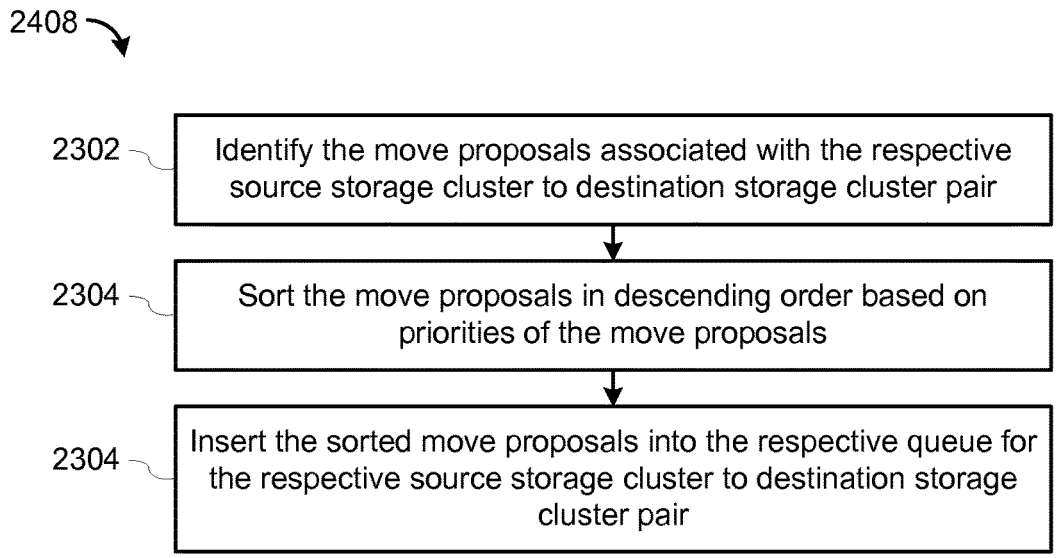
FIG. 23 is a flowchart of a method for inserting move proposals into a respective queue for a respective source storage cluster to destination storage cluster pair, according to some embodiments.

FIG. 23 is a flowchart of a method 2300 for inserting move proposals into a respective queue for a respective source storage cluster to destination storage cluster pair, according to some embodiments. The placement module 518 identifies (2302) the move proposals associated with the respective source storage cluster to destination storage cluster pair. The placement module 518 sorts (2304) the move proposals in descending order based on priorities of the move proposals. For example, the placement module 518 may sort the move proposals in descending order based on priority so that the highest priority move proposal is first in a respective queue. The placement driver inserts (2306) the sorted move proposals into the respective queue for the respective source storage cluster to destination storage cluster pair.

Issuing Moves of Data Between Storage Groups in a Distributed Storage System

The following discussion refers to the placement module 518 of the placement driver 108. However, it should be noted that the following discussion may be applied to any placement module of any placement driver. Furthermore, the following discussion refers to particular modules of the placement driver 108 performing particular operations. However, the operations discussed below may be performed by other modules of the placement driver 108.

Figure 24:
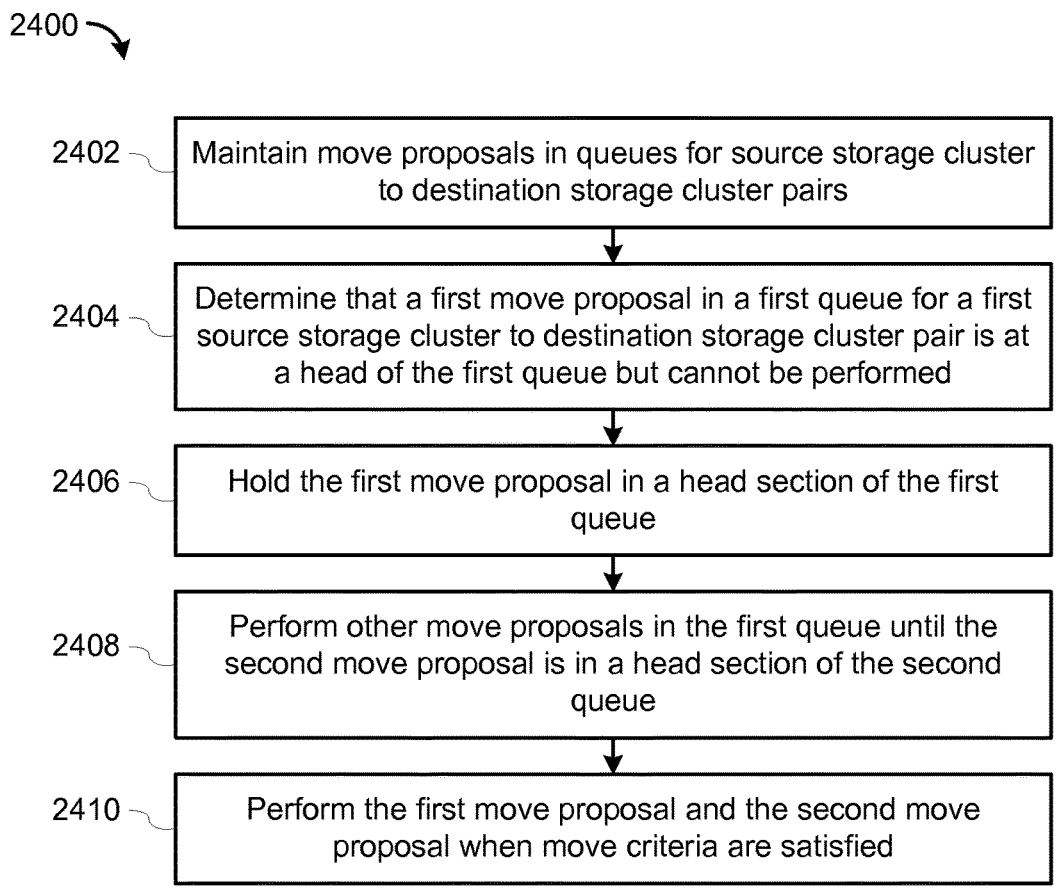
FIG. 24 is a flowchart of a method for issuing moves of data between storage groups in a distributed storage system, according to some embodiments.

FIG. 24 is a flowchart of a method 2400 for issuing moves of data between storage groups in a distributed storage system, according to some embodiments. The placement module 518 maintains (2402) move proposals in queues for source storage cluster to destination storage cluster pairs.

The placement module 518 determines (2404) that a first move proposal in a first queue for a first source storage cluster to destination storage cluster pair is at a head of the first queue but cannot be performed, the first move proposal being associated with first data, and the first data being associated with a second move proposal in a second queue for a second source storage cluster to destination storage cluster pair.

The placement module 518 holds (2406) the first move proposal in a head section of the first queue, a respective head section of a respective queue including move proposals that were eligible to be performed but could not be performed.

The placement module 518 performs (2408) other move proposals in the first queue until the second move proposal is in a head section of the second queue.

The placement module 518 performs (2410) the first move proposal and the second move proposal when move criteria are satisfied. In some embodiments, the placement module 518 performs a respective move proposal in a respective queue by issuing the respective move proposal to a respective server (e.g., the group server 800) in a respective destination storage cluster associated with the respective move proposal. In some embodiments, the move criteria are satisfied when a network link between the first source storage cluster to destination storage cluster pair can accommodate the first move proposal, a network link between the second source storage cluster to destination storage cluster pair can accommodate the second move proposal, performing the first move proposal does not prevent higher-priority move proposals in the first queue from being performed, and performing the second move proposal does not prevent higher-priority move proposals in the second queue from being performed. In some embodiments, the move criteria are satisfied when a network link between the first source storage cluster to destination storage cluster pair can accommodate the first move proposal and a network link between the second source storage cluster to destination storage cluster pair can accommodate the second move proposal.

Figure 25:
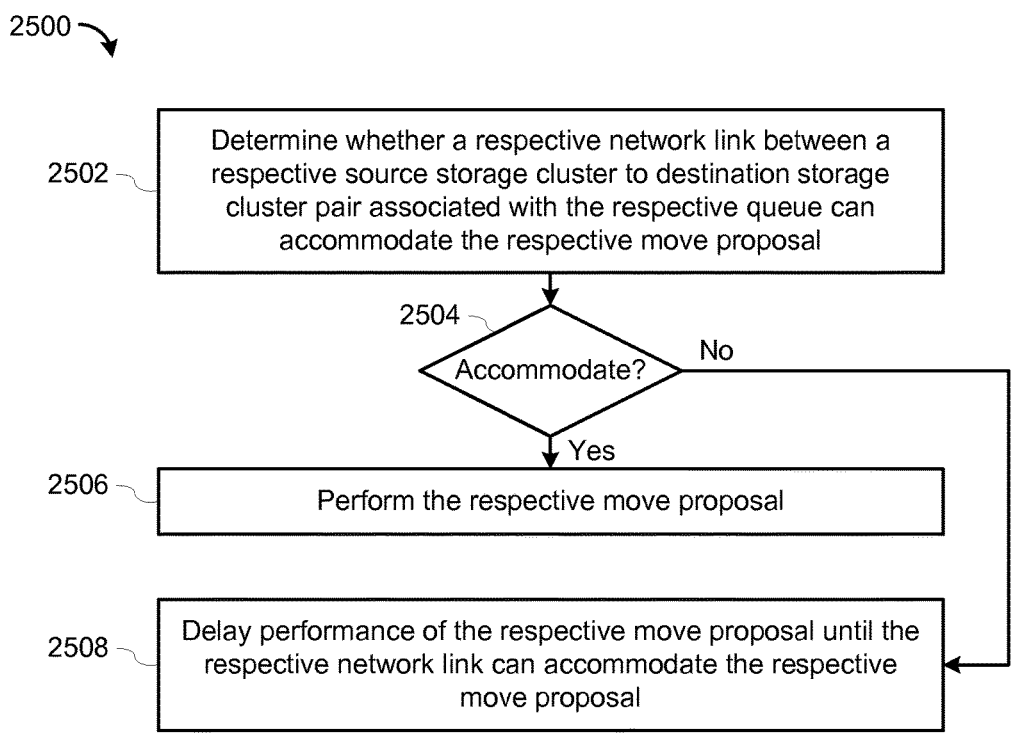
FIG. 25 is a flowchart of a method for a process of determining whether to perform a move proposal, according to some embodiments.

In some embodiments, prior to performing a respective move proposal in a respective queue, the placement module 518 determines whether to perform a move proposal. These embodiments are illustrated in FIG. 25, which is a flowchart of a method 2500 for a process of determining whether to perform a move proposal, according to some embodiments. The placement module 518 determines (2502) whether a respective network link between a respective source storage cluster to destination storage cluster pair associated with the respective queue can accommodate the respective move proposal. When the respective network link can accommodate the respective move proposal (2504, yes), the placement module 518 performs (2506) the respective move proposal. When the respective network link cannot accommodate the respective move proposal (2504, no), the placement module 518 delays (2608) performance of the respective move proposal until the respective network link can accommodate the respective move proposal.

The following is an example illustrating the process described with reference to FIGS. 24-25. In this example, assume that there are four storage clusters: W, X, Y, and Z. Also assume that splits A (size:10 priority:8), B (size:10 priority:7), C (size:30 priority:6), D (size:40 priority:5), E (size:50 priority:4), F (size:30 priority:3), G (size:10 priority:2), and H (size:10 priority:1) are being moved/copied as follows:

A from X to Y;
B from X to Y;
C from X to Z;
D from X to W;
E from X to W, Y and Z;
F from X to Y and Z;
G from X to W; and
H from X to Y.

Furthermore, assume that the higher priority value means higher priority and that all network links have the capacity of 20 and equal speed.

Thus, the source storage cluster to destination storage cluster pairs are XY, XZ, and XW. Furthermore, the data in the queues for the source storage cluster to destination storage cluster pairs are as follows:

XY[ ]: A B E F H
XZ[ ]: C E F
XW[ ]: D E G

Note that the square brackets for the source storage cluster to destination storage cluster pairs are used to indicate which data is currently moved. For example, XY[A] means that A is being moved in from source storage cluster X to destination storage cluster Y.

The example proceeds as follows. A and B are started in XY because the size of A and B is 10 each and the capacity of XY is 20. C is started in XZ and D is started in XW. E, F, G and H wait. The current states of the source storage cluster to destination storage cluster pairs are:

XY[AB]: E F H
XZ[C]: E F
XW[D]: E G

At some time in the future, A completes, but B, C and D are still being performed. E, F and G wait. Since E is eligible to be performed, but could not be performed because E could not be performed in XZ and XW yet, E is placed in the head section of XY. Since XY has space, H is started. The current states of the source storage cluster to destination storage cluster pairs are:

XY[BH]: E* F
XZ[C]: E F
XW[D]: E G

Note that the "E*" indicates that E is in the head section of XY. At some time in the future, B and H complete. E, F and G wait continue to wait. Note that E cannot be started in XY because E is still not eligible to be started in XZ and XW. The current states of the source storage cluster to destination storage cluster pairs are:

XY[ ]: E* F
XZ[C]: E F
XW[D]: E G

At some time in the future, C completes. E is now eligible to be started in XZ, but cannot be started in XZ because E is still not eligible to be started in XW. Thus, E continues to wait in XY and XZ, and is accordingly in the head sections of XY and XZ. Since XZ has capacity, F is started. E and G continue to wait in XW. The current states of the source storage cluster to destination storage cluster pairs are:

XY[F]: E*
XZ[F]: E*
XW[D]: E G

At some time in the future, D completes. E is now eligible to be performed in XW, but cannot be performed because XY and XZ are still performing F. Thus, E waits in all head sections. G is blocked from being performed in XW because E is in the head section of all source storage cluster to destination storage cluster pairs. The current states of the source storage cluster to destination storage cluster pairs are:

XY[F]: E*
XZ[F]: E*
XW[ ]: E* G

When F completes, E is started in XY, XZ, and XW. G waits. The current states of the source storage cluster to destination storage cluster pairs are:

XY[E]:
XZ[E]:
XW[E]: G

When E completes, G is started and completes at some future time.

Estimating Data Size in Distributed Storage Systems

The distributed storage system 100 distributes data across various storage clusters. As discussed above, it is often necessary to obtain the sizes of data, for example, to decide how to spread these data units among candidate locations to improve system performance.

Several assumptions and/or observations may be made regarding the determination of the size of data (e.g., splits) in the distributed storage system 100:

exact data sizes are known only at the actual physical data locations (e.g., the tablet servers managing the storage groups);

exact data sizes can change quickly, but drastic size changes are rare;

quantizing and rounding data sizes up has the following advantages: (1) making decisions based on quantized data sizes makes them valid for a longer time, as they are resilient to small changes in data size; in particular, these decisions have a better chance to remain valid for longer than the (potentially long) time needed to apply them, and (2) ropagating quantized data sizes reduces the overhead of maintaining data size information, as updates need only be made when the quantized size changes, which is less common than changes in the exact data size;

many decisions in the distributed storage system 100 can be made based solely on an order of magnitude of the data units involved, which allows for using progressive quantization, wherein subsequent quants are multiplies of the previous ones (rather than all of them being subsequent multiplies of the same base size); this further reduces the overhead of propagating the size information; and in many cases, data size matters only above some threshold, and all data sizes below that threshold can be represented by a single "default" size; one can then use the default size when no size information is present, which reduces the size estimation overhead even further, as the default sizes are neither stored nor propagated.

In the distributed storage system 100, the data unit is the split, which includes multiple smaller elements stored in separate and immutable files. Multiple files jointly form tablets, which enable the splits to mutate over time by storing subsequent versions of the smaller elements in different files, and by remembering which version is the newest. Each tablet is assigned to a particular storage cluster of the distributed storage system 100 where its underlying files are stored. A tablet server in the storage cluster manages the tablet. Multiple tablets might form replication groups to keep data available despite failures of individual tablets. In that case, data in all tablets in a replication group is essentially the same, and the failures can be tolerated because of the data being available in multiple redundant files, possibly saved in different storage clusters.

The decision-making components can look for split sizes either for a given tablet, or for multiple tablets at once. In the latter case, the split size information for multiple tablets is stored in a designed replication group (e.g., a fault-tolerant replication group). This means that the split sizes have to propagate from the original files through tablets to the designated replication group, which is potentially replicated over multiple datacenters. At each stage, the tablet server (e.g., the tablet server 133-1), filters, and/or quantizes the split sizes such that the overall split size information progressively becomes even smaller and less precise. In particular, at the very beginning of the split size propagation pipeline, the tablet server calculates the exact size of data that belongs to a given split and is stored in a particular file. This information is appended to the actual file when it is created, and never changes. At regular intervals, the tablet server may rewrite the immutable files belonging to a given tablet to delete the old data versions. This is when the actual changes to the data size get reflected in the data size information.

When requested, the tablet server calculates the size of all splits contained in a given tablet. To this end, it iterates over all the files in the tablet, and builds a dictionary of exact split sizes, adding together sizes of data belonging to the same split yet saved in different files. This dictionary can be used directly by decision-making operations that are only interested in a single tablet.

For the benefit of decision-making operations interested in multiple tablets, distributed storage system 100 periodically propagates the contents of per-tablet dictionaries to the designated replication group that maintains the split size information for a number of tablets. Since this propagation often involves cross-datacenter communication, the tablet server attempts to minimize both the frequency and the amount of data being propagated by:
- ignoring the split sizes smaller than 1 MB;
- progressively quantizing the split sizes larger or equal to 1 MB to the next power of 2*1 MB;
- remembering the propagated sizes in the tablet and propagating only those that have changed; and
- propagating only a fixed number of largest 100 sizes per tablet.

In doing so, the designated replication group can efficiently keep track of large split sizes in a large number of tablets. The decision-making components interested in multiple tablets focus on the large splits in their calculations, and assume the default size of 64 KB for all the splits for which the size information is missing.

Several alternatives to the technique described above for determining sizes of data in the distributed storage system are presented below:
- propagating all sizes (not just the largest ones), which means extra storage and traffic overhead;
- propagating exact sizes (without quantization), which means extra storage and traffic overhead;
- propagating non-progressively quantized sizes, which means extra traffic overhead in exchange for minimal storage gain;
- propagating progressively quantized sizes whether they changed or not, which means extra traffic overhead;
- propagating all qualifying sizes (instead of just largest ones), which means extra memory overhead on the server computing the per-tablet split size dictionary, and introduces the risk of that server running out of memory when the split size dictionaries are computed simultaneously for a large number of tablets, and/or when any of these tablets contain a large number of qualifying split sizes;
- caching sizes in tablets instead of computing them on demand, which means extra storage overhead in exchange for less computation;
- maintaining size information for multiple tablets in a designated tablet (resulting in lower availability); and/or
- using different tuning parameters, such as minimum size threshold (other than 1 MB), default size (other than 64K), quantization factor (other than 2), number of sizes per tablet (other than 100), and rewriting/propagation frequencies.

The methods illustrated in FIGS. 9-25 may be governed by instructions that are stored in a computer readable storage medium and that are executed by at least one processor of at least one server. Each of the operations shown in FIGS. 9-25 may correspond to instructions stored in a non-transitory computer memory or computer readable storage medium. In various embodiments, the non-transitory computer readable storage medium includes a magnetic or optical disk storage device, solid state storage devices such as Flash memory, or other non-volatile memory device or devices. The computer readable instructions stored on the non-transitory computer readable storage medium may be in source code, assembly language code, object code, or other instruction format that is interpreted and/or executable by one or more processors.

Plural instances may be provided for components, operations or structures described herein as a single instance. Finally, boundaries between various components, operations, and data stores are somewhat arbitrary, and particular operations are illustrated in the context of specific illustrative configurations. Other allocations of functionality are envisioned and may fall within the scope of the embodiment(s). In general, structures and functionality presented as separate components in the example configurations may be implemented as a combined structure or component. Similarly, structures and functionality presented as a single component may be implemented as separate components. These and other variations, modifications, additions, and improvements fall within the scope of the embodiment(s).

It will also be understood that, although the terms "first," "second," etc. may be used herein to describe various elements, these elements should not be limited by these terms. These terms are only used to distinguish one element from another. For example, a first contact could be termed a second contact, and, similarly, a second contact could be termed a first contact, which changing the meaning of the description, so long as all occurrences of the "first contact" are renamed consistently and all occurrences of the second contact are renamed consistently. The first contact and the second contact are both contacts, but they are not the same contact.

The terminology used herein is for the purpose of describing particular embodiments only and is not intended to be limiting of the claims. As used in the description of the embodiments and the appended claims, the singular forms "a", "an" and "the" are intended to include the plural forms as well, unless the context clearly indicates otherwise. It will also be understood that the term "and/or" as used herein refers to and encompasses any and all possible combinations of one or more of the associated listed items. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

As used herein, the term "if" may be construed to mean "when" or "upon" or "in response to determining" or "in accordance with a determination" or "in response to detecting," that a stated condition precedent is true, depending on the context. Similarly, the phrase "if it is determined (that a stated condition precedent is true)" or "if (a stated condition precedent is true)" or "when (a stated condition precedent is true)" may be construed to mean "upon determining" or "in response to determining" or "in accordance with a determination" or "upon detecting" or "in response to detecting" that the stated condition precedent is true, depending on the context.

The foregoing description included example systems, methods, techniques, instruction sequences, and computing machine program products that embody illustrative embodiments. For purposes of explanation, numerous specific details were set forth in order to provide an understanding of various embodiments of the inventive subject matter. It will be evident, however, to those skilled in the art that embodiments of the inventive subject matter may be practiced without these specific details. In general, well-known instruction instances, protocols, structures and techniques have not been shown in detail.

The foregoing description, for purpose of explanation, has been described with reference to specific embodiments. However, the illustrative discussions above are not intended to be exhaustive or to limit the embodiments to the precise forms disclosed. Many modifications and variations are possible in view of the above teachings. The embodiments were chosen and described in order to best explain the principles and their practical applications, to thereby enable others skilled in the art to best utilize the embodiments and various embodiments with various modifications as are suited to the particular use contemplated.

What is claimed is:

1. A computer-implemented method for moving data between storage groups in a distributed storage system having a plurality of zones at distinct geographic locations, performed on a server having at least one processor and a non-transitory computer readable storage medium storing one or more programs configured for execution by the one or more processors to perform the method, comprising:
   storing data for a plurality of directories in the distributed storage system, wherein data for each directory is subdivided into one or more splits, each split is assigned to a respective storage group, and replicas of each storage group are physically stored as tablets in a plurality of zones according to a respective replication policy;
   maintaining a data structure including information relating to storage groups in the distributed storage system, each respective entry in the data structure for a respective storage group including placement metrics for the respective storage group, including a placement metric that measures a current amount of storage space being used by the respective storage group;
   computing a current total group usage as a sum of the placement metrics for each of the storage groups;
   computing a global storage group limit as a function of a total number of storage groups in the distributed storage system, a group storage limit, and a predetermined factor;
   creating one or more new storage groups when the current total group usage exceeds the global storage group limit;
   receiving, from a computer system, a request to move a first split from a first storage group to a new storage group in the distributed storage system;
   using the data structure to identify a second storage group whose placement metrics satisfy a selection criterion;
   creating a second storage group container in the second storage group to receive the first split from the first storage group;
   copying data for the first split from tablets corresponding to a first storage group container in the first storage group to tablets corresponding to the second storage group container in the second storage group; and
   executing a transaction to perform the following operations:
      dereferencing the first storage group container in the first storage group;
      in an index in the distributed storage system, dissociating a first identifier for the first storage group container from the first split; and
      in the index in the distributed storage system associating a second identifier for the second storage group container with the first split.

2. The computer-implemented method of claim 1, wherein using the data structure to identify a second storage group whose placement metrics satisfy the selection criterion includes:
   calculating group placement scores for the storage groups in the distributed storage system based on the placement metrics for the storage groups; and
   determining a storage group in the distributed storage system whose group placement score satisfies the selection criterion;
   wherein calculating a respective group placement score for a respective storage group includes:
      when the current amount of storage space being used by the respective storage group to store data is greater than the group storage limit, calculating the respective group placement score as a predetermined low score; and
      when the current amount of storage space being used by the respective storage group to store data is less than or equal to the group storage limit, calculating the respective group placement score as a function of the current amount of storage space being used by the respective storage group to store data, wherein the function biases selection of storage groups that have more available storage space.

3. The computer-implemented method of claim 1, wherein a number of new storage groups that are created is a function of the current amount of storage space being used by all storage groups in the distributed storage system to store data, a target group size, and a total number of storage groups in the distributed storage system.

4. A system to move data between storage groups in a distributed storage system having a plurality of zones at distinct geographic locations, comprising:
   one or more processors;
   a non-transitory computer readable storage medium; and
   one or more programs stored in the non-transitory computer readable storage medium and executable by the one or more processors;
   circuitry for storing data for a plurality of directories in the distributed storage system, wherein data for each directory is subdivided into one or more splits, each split is assigned to a respective storage group, and replicas of each storage group are physically stored as tablets in a plurality of zones according to a respective replication policy;
   a data structure stored in the non-transitory computer readable storage medium, wherein the data structure includes information relating to storage groups in the distributed storage system and each respective entry in the data structure for a respective storage group includes placement metrics for the respective storage group, including a placement metric that measures a current amount of storage space being used by the respective storage group;

circuitry for computing a current total group usage as a sum of the placement metrics for each of the storage groups;

circuitry for computing a global storage group limit as a function of a total number of storage groups in the distributed storage system, a group storage limit, and a predetermined factor;

circuitry for creating one or more new storage groups when the current total group usage exceeds the global storage group limit;

circuitry for receiving, from a computer system, a request to move a first split from a first storage group to a new storage group in the distributed storage system;

circuitry for using the data structure to identify a second storage group whose placement metrics satisfy a selection criterion;

circuitry for creating a second storage group container in the second storage group to receive the data from the first storage group;

circuitry for copying data for the first split from tablets corresponding to a first storage group container in the first storage group to tablets corresponding to the second storage group container in the second storage group; and circuitry for executing a transaction including the following instructions:
  dereference the first storage group container in the first storage group;
  in an index in the distributed storage system, dissociate a first identifier for the first storage group container from the first split; and
  in the index in the distributed storage system, associate a second identifier for the second storage group container with the first split.

5. The system of claim 4, wherein using the data structure to identify a second storage group whose placement metrics satisfy the selection criterion includes:
  calculating group placement scores for the storage groups in the distributed storage system based on the placement metrics for the storage groups; and
  determining a storage group in the distributed storage system whose group placement score satisfies the selection criterion;
  wherein calculating a respective group placement score for a respective storage group includes:
    when the current amount of storage space being used by the respective storage group to store data is greater than the group storage limit, calculating the respective group placement score as a predetermined low score; and
    when the current amount of storage space being used by the respective storage group to store data is less than or equal to the group storage limit, calculating the respective group placement score as a function of the current amount of storage space being used by the respective storage group to store data, wherein the function biases selection of storage groups that have more available storage space.

6. The system of claim 4, wherein a number of new storage groups that are created is a function of the current amount of storage space being used by all storage groups in the distributed storage system to store data, a target group size, and a total number of storage groups in the distributed storage system.

7. A non-transitory computer readable storage medium storing-one or more programs configured for execution by one or more processors of a computer system, the one or more programs comprising instructions for:
  storing data for a plurality of directories in a distributed storage system having a plurality of zones at distinct geographic locations, wherein data for each directory is subdivided into one or more splits, each split is assigned to a respective storage group, and replicas of each storage group are physically stored as tablets in a plurality of zones according to a respective replication policy;
  maintaining a data structure including information relating to storage groups in the distributed storage system, each respective entry in the data structure for a respective storage group including placement metrics for the respective storage group, including a placement metric that measures a current amount of storage space being used by the respective storage group;
  computing a current total group usage as a sum of the placement metrics for each of the storage groups;
  computing a global storage group limit as a function of a total number of storage groups in the distributed storage system, a group storage limit, and a predetermined factor;
  creating one or more new storage groups when the current total group usage exceeds the global storage group limit;
  receiving, from a computer system, a request to move a first split from a first storage group to a new storage group in the distributed storage system;
  using the data structure to identify a second storage group whose placement metrics satisfy a selection criterion;
  creating a second storage group container in the second storage group to receive the first split from the first storage group;
  copying data for the first split from tablets corresponding to a first storage group container in the first storage group to tablets corresponding to the second storage group container in the second storage group; and
  executing a transaction to perform the following operations:
    dereferencing the first storage group container in the first storage group;
    in an index in the distributed storage system, dissociating a first identifier for the first storage group container from the first split; and
    in the index in the distributed storage system associating a second identifier for the second storage group container with the first split.

8. The computer readable storage medium of claim 7, wherein using the data structure to identify a second storage group whose placement metrics satisfy the selection criterion includes:
  calculating group placement scores for the storage groups in the distributed storage system based on the placement metrics for the storage groups; and
  determining a storage group in the distributed storage system whose group placement score satisfies the selection criterion;
  wherein calculating a respective group placement score for a respective storage group includes:
    when the current amount of storage space being used by the respective storage group to store data is greater than the group storage limit, calculating the respective group placement score as a predetermined low score; and when the current amount of storage space being used by the respective storage group to store data is less than or equal to the group storage limit, calculating the respective group placement score as a function of the current amount of storage space being used by the respective storage group to store data, wherein the function biases selection of storage groups that have more available storage space.

9. The computer readable storage medium of claim 7, wherein a number of new storage groups that are created is a function of the current amount of storage space being used by all storage groups in the distributed storage system to store data, a target group size, and a total number of storage groups in the distributed storage system.

\* \* \* \* \*